(12) United States Patent
Bennett

(10) Patent No.: US 7,953,315 B2
(45) Date of Patent: *May 31, 2011

(54) ADAPTIVE VIDEO PROCESSING CIRCUITRY AND PLAYER USING SUB-FRAME METADATA

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 1293 days.

This patent is subject to a terminal disclaimer.

(21) Appl. No.: 11/491,050

(22) Filed: Jul. 20, 2006

(65) Prior Publication Data

US 2008/0018785 A1    Jan. 24, 2008

Related U.S. Application Data

(63) Continuation-in-part of application No. 11/474,032, filed on Jun. 23, 2006.

(60) Provisional application No. 60/802,423, filed on May 22, 2006.

(51) Int. Cl.
*H04N 5/93* (2006.01)
*H04N 5/775* (2006.01)

(52) U.S. Cl. .................................. 386/353; 386/230

(58) Field of Classification Search ............ 386/46, 386/68, 69, 67, 52

See application file for complete search history.

(56) References Cited

U.S. PATENT DOCUMENTS

| | | | | |
|---|---|---|---|---|
| 5,377,051 | A | * | 12/1994 | Lane et al. ............... 386/81 |
| 2002/0092029 | A1 | | 7/2002 | Smith |
| 2006/0023063 | A1 | | 2/2006 | Okawa |

FOREIGN PATENT DOCUMENTS

| | | | |
|---|---|---|---|
| CN | 03135673 | A | 6/1991 |
| CN | 1666503 | A | 9/2005 |
| CN | 1732690 | A | 2/2006 |
| EP | 1130506 | A2 | 9/2001 |
| GB | 2378836 | A | 2/2003 |
| JP | 2004120404 | A | 4/2004 |
| KR | 20040018395 | A | 3/2004 |

OTHER PUBLICATIONS

Askelof J, et al, "Metadata-driven multimedia access", IEEE Signal Processing Magazine, IEEE Service Center, Mar. 1, 2003, vol. 20, No. 2, pp. 40-52, Piscataway, NJ.
European Search Report for EP Application No./Patent No. 07001726.3-1522/1871100, dated Apr. 29, 2010.

* cited by examiner

*Primary Examiner* — Robert Chevalier
(74) *Attorney, Agent, or Firm* — Garlick Harrison & Markison; Bruce E. Garlick

(57) ABSTRACT

Video player circuitry used with encoded source video and a display. Decoder circuitry receives encoded source video and decodes the encoded source video to produce a sequence of full frames of video data. Pre-processing circuitry, pursuant to sub-frame information, generates a plurality of sequences of sub-frames of video data from the sequence of full frames of video data, a first sequence of the plurality of sequences of sub-frames of video data having a different center point within the sequence of full frames of video data than that of a second sequence of the plurality of sequences of sub-frames of video data. Post-processing circuitry, pursuant to supplemental information, modifies the plurality of sequences of sub-frames of video data to produce an output. Interface circuitry that delivers the output for subsequent presentation on the display.

22 Claims, 17 Drawing Sheets

ADAPTIVE VIDEO PROCESSING CIRCUITRY AND PLAYER USING SUB-FRAME METADATA

CROSS REFERENCES TO RELATED APPLICATIONS

The present application is a continuation-in-part of Utility application Ser. No. 11/474,032 filed on Jun. 23, 2006, and entitled "VIDEO PROCESSING SYSTEM THAT GENERATES SUB-FRAME METADATA," (BP5273), which claims priority to Provisional Application No. 60/802,423, filed May 22, 2006, both of which are incorporated herein in their entirety by reference for all purposes.

The present application also claims priority to Provisional Application No. 60/802,423, filed May 22, 2006.

The present application is related to the following co-pending applications:

1. Utility application Ser. No. 11/491,051 filed on even date herewith, and entitled "ADAPTIVE VIDEO PROCESSING USING SUB-FRAME METADATA" (BP5447); and 2. Utility application Ser. No. 11/491,019 filed on even date herewith, and entitled "SIMULTANEOUS VIDEO A SUB-FRAME METADATA CAPTURE SYSTEM" (BP5448), both of which are incorporated herein by reference for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention is related generally to video processing devices, and more particularly to the preparation of video information to be displayed on a video player.

2. Description of Related Art

Movies and other video content are often captured using 35 mm film with a 16:9 aspect ratio. When a movie enters the primary movie market, the 35 mm film is reproduced and distributed to various movie theatres for sale of the movie to movie viewers. For example, movie theatres typically project the movie on a "big-screen" to an audience of paying viewers by sending high lumen light through the 35 mm film. Once a movie has left the "big-screen," the movie often enters a secondary market, in which distribution is accomplished by the sale of video discs or tapes (e.g., VHS tapes, DVD's, high-definition (HD)-DVD's, Blue-ray DVD's, and other recording mediums) containing the movie to individual viewers. Other options for secondary market distribution of the movie include download via the Internet and broadcasting by television network providers.

For distribution via the secondary market, the 35 mm film content is translated film frame by film frame into raw digital video. For HD resolution requiring at least 1920×1080 pixels per film frame, such raw digital video would require about 25 GB of storage for a two-hour movie. To avoid such storage requirements, encoders are typically applied to encode and compress the raw digital video, significantly reducing the storage requirements. Examples of encoding standards include, but are not limited to, Motion Pictures Expert Group (MPEG)-1, MPEG-2, MPEG-2-enhanced for HD, MPEG-4 AVC, H.261, H.263 and Society of Motion Picture and Television Engineers (SMPTE) VC-1.

To accommodate the demand for displaying movies on telephones, personal digital assistants (PDAs) and other handheld devices, compressed digital video data is typically downloaded via the Internet or otherwise uploaded or stored on the handheld device, and the handheld device decompresses and decodes the video data for display to a user on a video display associated with the handheld device. However, the size of such handheld devices typically restricts the size of the video display (screen) on the handheld device. For example, small screens on handheld devices are often sized just over two (2) inches diagonal. By comparison, televisions often have screens with a diagonal measurement of thirty to sixty inches or more. This difference in screen size has a profound affect on the viewer's perceived image quality.

For example, typical, conventional PDA's and high-end telephones have width to height screen ratios of the human eye. On a small screen, the human eye often fails to perceive small details, such as text, facial features, and distant objects. For example, in the movie theatre, a viewer of a panoramic scene that contains a distant actor and a roadway sign might easily be able to identify facial expressions and read the sign's text. On an HD television screen, such perception might also be possible. However, when translated to a small screen of a handheld device, perceiving the facial expressions and text often proves impossible due to limitations of the human eye.

Screen resolution is limited if not by technology then by the human eye no matter what the size screen. On a small screen however, such limitations have the greatest impact. For example, typical, conventional PDA's and high-end telephones have width to height screen ratios of 4:3 and are often capable of displaying QVGA video at a resolution of 320× 240 pixels. By contrast, HD televisions typically have screen ratios of 16:9 and are capable of displaying resolutions up to 1920×1080 pixels. In the process of converting HD video to fit the far lesser number of pixels of the smaller screen, pixel data is combined and details are effectively lost. An attempt to increase the number of pixels on the smaller screen to that of an HD television might avoid the conversion process, but, as mentioned previously, the human eye will impose its own limitations and details will still be lost.

Video transcoding and editing systems are typically used to convert video from one format and resolution to another for playback on a particular screen. For example, such systems might input DVD video and, after performing a conversion process, output video that will be played back on a QVGA screen. Interactive editing functionality might also be employed along with the conversion process to produce an edited and converted output video. To support a variety of different screen sizes, resolutions and encoding standards, multiple output video streams or files must be generated.

Video is usually captured in the "big-screen" format, which server well for theatre viewing. Because this video is later transcoded, the "big-screen" format video may not adequately support conversion to smaller screen sizes. In such case, no conversion process will produce suitable video for display on small screens. Further limitations and disadvantages of conventional and traditional approaches will become apparent to one of ordinary skill in the art through comparison of such systems with various aspects of the present invention.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

DETAILED DESCRIPTION OF THE INVENTION

Figure 1:
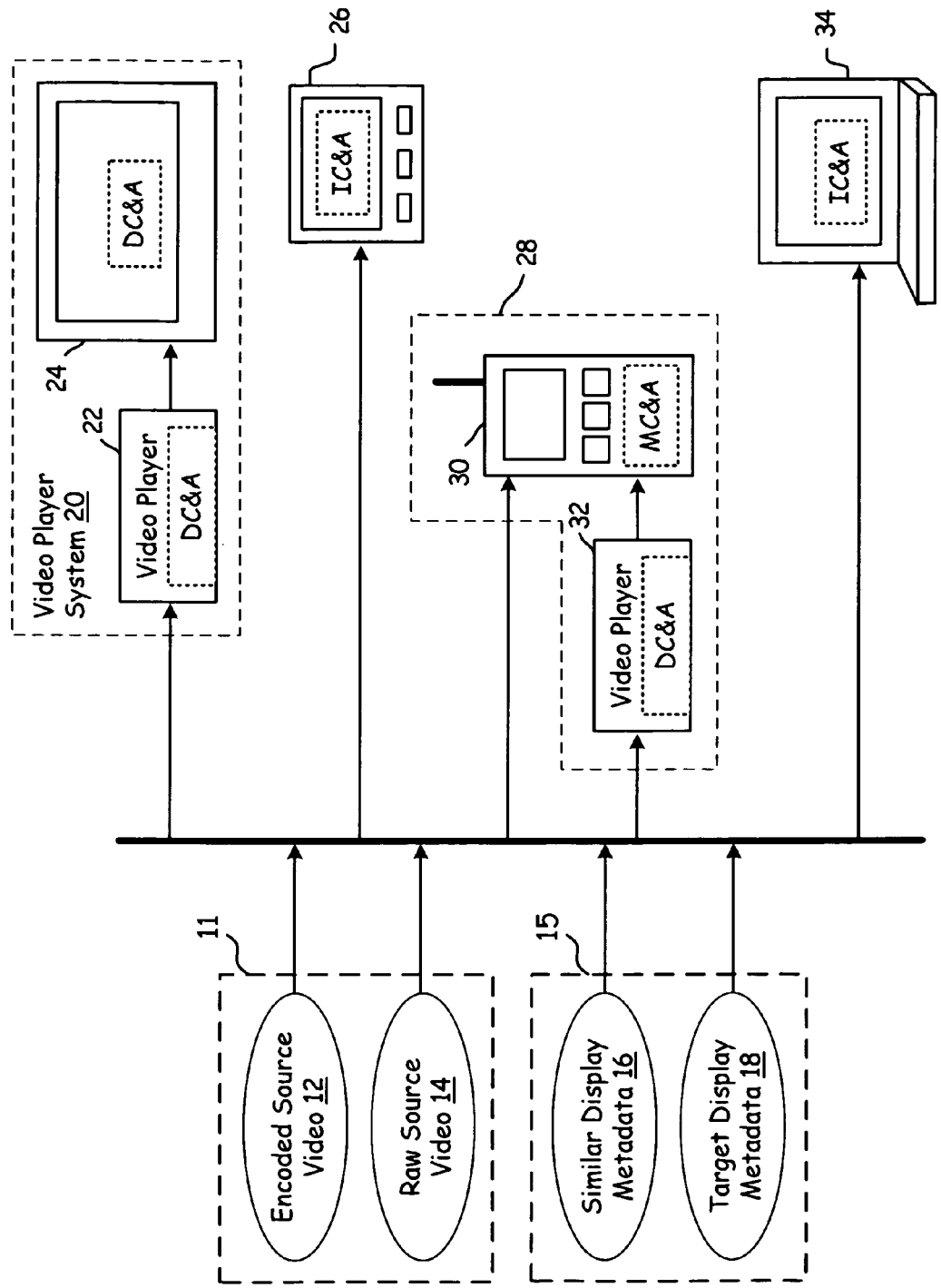
FIG. 1 is a system diagram illustrating a plurality of video player systems constructed according to various embodiments of the present invention.

FIG. 1 is a system diagram illustrating a plurality of video player systems constructed according to various embodiments of the present invention. As illustrated, the video player systems of the present invention may be contained within a single device or distributed among multiple devices. The manner in which a video player system of the present invention may be contained within a single device is illustrated by video players 26 and 34. The manner in which a video player system of the present invention is distributed within multiple devices is illustrated with by video player systems 20 and 28. Video player system 20 includes video player 22 and video display device 24. Video player system 28 includes video player and video display device 30.

The functionality of the video player systems of FIG. 1 includes generally three types of functionalities. A first type of functionality is multi-mode video circuitry and application (MC&A) functionality. The MC&A functionality may operate in either/both a first mode and a second mode. In a first mode of operation of the MC&A functionality, the video display device 30, for example, receives source video 11 and metadata 15 via a communication link or via a media such as a DVD. The video display device 30, in the first mode of operation of the MC&A functionality, uses both the source video 11 and the metadata 15 for processing and playback operations resulting in the display of video.

The source video 11 received by video display device 30 may be encoded source video 12 or raw source video 14. The metadata 15 may be similar display metadata 16 or target display metadata 18. Generally, encoded source video 12 and raw source video 14 have similar content through the former is encoded while the later is not encoded. Generally, source video 11 includes a sequence of full-frames of video data such that may be captured by a video camera. The capture of the full-frame will be described further with reference to FIGS. 4 through 9.

Metadata 15 is additional information that is used in video processing operations to modify the sequence of full frame of video data particularly to produce video for play back on a target video display of a target video player. The manner in which metadata 15 is created and its relationship to the source video 11 will be described further with reference to FIG. 4 through FIG. 9. With the MC&A first mode operations, video display device 30 uses the source video 11 and metadata 15 in combination to produce an output for its video display. Generally, similar display metadata 16 has attributes tailored to a class or group of targeted video players. The target video players within this class or group may have similar screen resolution, similar aspect radios, or other similar characteristics that lend well to modifying source video to produce modified source video for presentation on video displays of the class of video players. Alternatively, the target display metadata 18 includes information unique to a make/model/type of video player. When a video player, e.g. video display device 30, uses the target display metadata 18 for modification of the source video 11, the modified video is particularly tailored to the video display of the video display device 30.

In the second mode of operation of the MC&A functionality of the video player system of the present invention, the video display device 30 receives and displays video (encoded video or raw video) that has been processed previously using metadata 15 by another video player 32. For example, with the video player system 28, video player 32 has previously processed the source video 11 using the metadata 15 to produce an output to video display device 30. With this second mode of operation of the MC&A functionality, the video display device 30 receives the output of video player 32 for presentation, and presents such output on its video display. The MC&A functionality of the video display device 30 may further modify the video data received from the video player 32.

Another functionality employed by one or more of the video player systems 26 and/or 34 of FIG. 1 includes Integrated Video Circuitry and Application functionality (IC&A).

The IC&A functionality of the video player systems 26 and 34 of FIG. 1 receives source video 11 and metadata 15 and processes the source video 11 and the metadata 15 to produce video output for display on a corresponding video player 34, for example. Each of the video player systems 34 and 36 receives both the source video 11 and the metadata 15 via corresponding communication links and its IC&A functionality processes the source video 11 and metadata 15 to produce video for display on the video display of the corresponding video player systems 26 and 34.

According to another aspect of FIG. 1, a video player system may include Distributed video Circuitry and Application (DC&A) functionality. The DC&A functionality associated with video player 32 receives source video 11 and metadata 15 and produces sub-frame video data by processing of the source video 11 in conjunction with the metadata 15. The DC&A functionality of video players 22 and 32 present outputs to corresponding video display devices 24 and 30, respectively. The corresponding video players 24 and 30, using their respective functionality, may further modify the received video inputs and then present video upon their respective displays.

Depending on the particular implementation and the particular operations of the video player systems of FIG. 1, their functions may be distributed among multiple devices. For example, with video player system 20, video player 22, and video display device 24 both includes DC&A functionality. The distributed DC&A functionality may be configured in various operations to share processing duties that either or both could perform. Further, with the video player system 28, video player 32, and video display device 30 may share processing functions that change from time to time based upon particular current configuration of the video player system 28.

Figure 2:
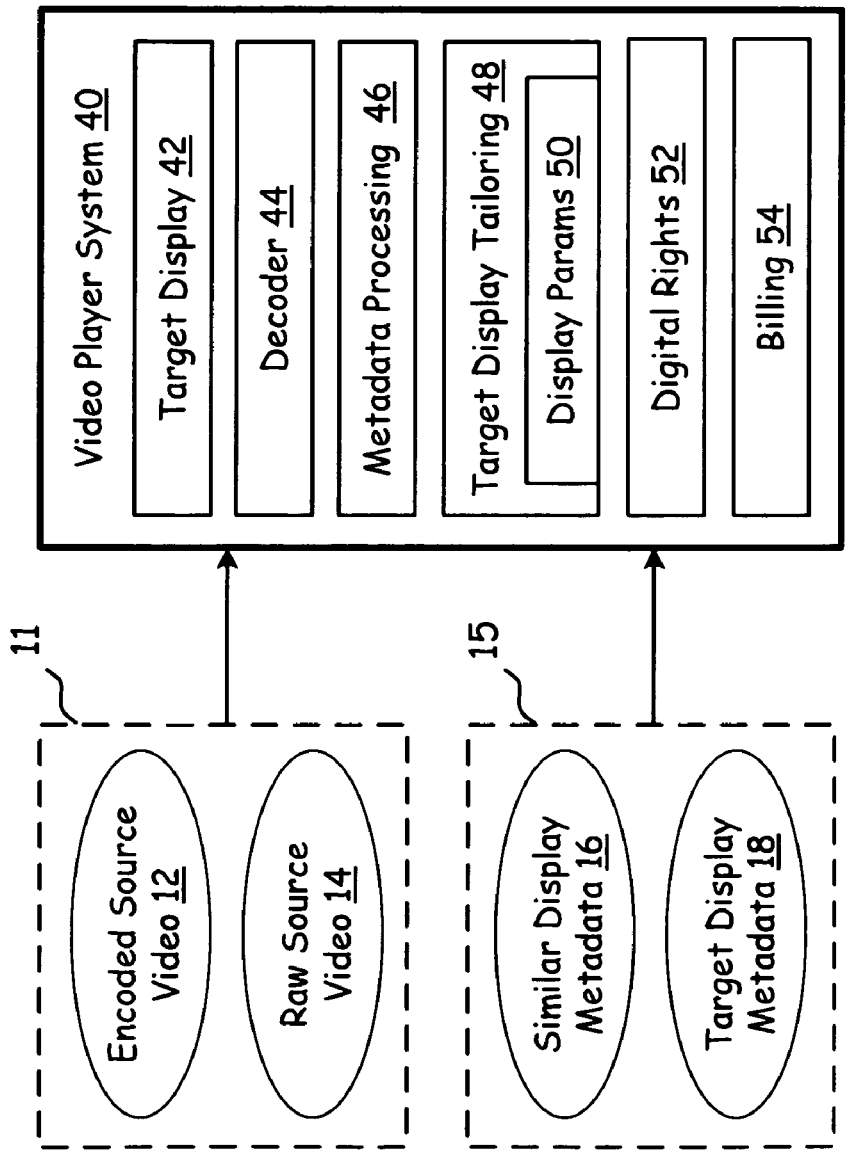
FIG. 2 is a block diagram illustrating a video player system constructed according to an embodiment of the present invention.

FIG. 2 is a block diagram illustrating a video player system constructed according to an embodiment of the present invention. The video player system 40 illustrated in FIGS. 2 includes functional components that are implemented in hardware, software, or a combination of hardware and software. Video player system 40 includes a target display 42, a decoder 44, metadata processing circuitry 46, target display tailoring circuitry 48, digital rights circuitry 52, and billing circuitry 54. The video player system 40 receives source video 11 that includes one or both of encoded sources video 12 and raw source video 14. The Video player system 40 further receives metadata 15 that includes one or more of similar display metadata 15 and target display metadata 18. Generally, the target display 42 of video player system 40 displays output that is produced by either metadata processing circuitry 46 or target display tailoring circuitry 48.

Decoder 44 is operable to receive and decode encoded source video 12 to produce a sequence of full frames of video data. Metadata processing circuitry 46 is operable to receive a sequence of full frame of video data received from decoder 44. Alternately, the metadata processing circuitry 46 is operable to receive a sequence of full frames of video data directly as raw source video 14. In either case, the metadata processing circuitry 46 is operable to process the sequence of full frames of video data based upon metadata 15 (either similar display metadata 16 or target display metadata 18). Generally, based upon the metadata 15, the metadata processing circuitry 46 is operable to generate a plurality of sequences of sub-frames of video data from the sequence of full-frame and video data. In one operation, a first sequence of the plurality of sequences of sub-frames of video data has a different center point within the sequence of full frame of video data than that of a second sequence of the plurality of sequences of sub-frames of video data. These concepts will be described further with reference to FIGS. 5 through 9.

The target display tailoring circuitry 48 may perform post-processing operations pursuant to supplemental information such as target display parameters 50 to modify the plurality of sequences of sub-frames of video data to produce an output. The output of the target display tailoring circuitry 48 is then displayed on target display 42. When the target displayer tailoring circuitry 48 is not used to perform post-processing of the plurality of sequences of sub-frames of video data, the output of metadata processing 46 is provided directly to the target display 42.

Digital rights circuitry 52 of the video player system 40 is employed to determine whether or not the video player system 40 has rights to use/modify source video 11 and/or metadata 15 and/or to produce video for display based thereupon on the target display 42. The digital rights circuitry 52 may interact with a remote server or other commuting systems in determining whether such digital rights exist. However, the digital rights circuitry 52 may simply look at portions of the source video 11 and or the metadata 15 to determine whether the video player system 40 has rights to operate upon such. Billing circuitry 54 of the video player system 40 operates to produce a billing record locally or remotely to cause billing for usage of the source video 11 and or the metadata 15. The billing circuitry 54 may operate in conjunction with a remote server or servers in initiating such billing record generation.

Figure 3:
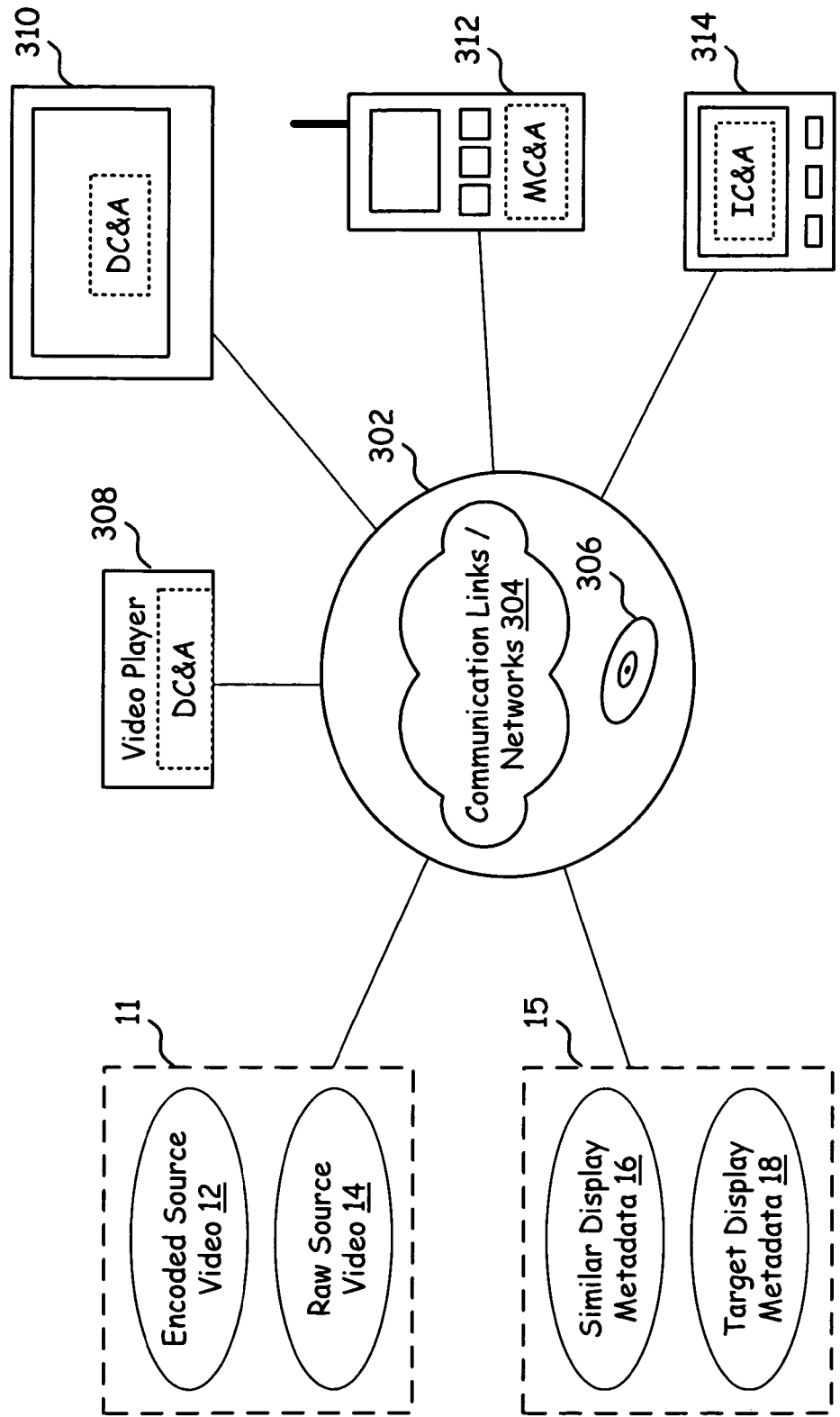
FIG. 3 is a system diagram illustrating the communication interconnection of a plurality of video player systems constructed according to the corresponding embodiments of the present invention.

FIG. 3 is a system diagram illustrating the communication interconnection of a plurality of video player systems constructed according to the corresponding embodiments of the present invention. Generally, the source video 11 and the metadata 15 are transferred to video player systems 308, 310, 320, and 314 via communication links/networks 304 or tangible media 306. The communication links/networks 304 may include one or more of the Internet, Local Area Networks (LANs), Wireless Local Area Networks (WLANs), Wide Area Networks (WANs), the telephone network, cable modem networks, satellite communication networks, Worldwide Interoperability for Microwave Access (WiMAX) networks, and/or other wired and/or wireless communication links. When the source video 11 and/or metadata 15 is contained in a media such as a DVD or CD 306, a corresponding video player system 308, 310, 312, or 314 receives the media 306 within a media drive and reads the media 306 using the media drive. As it shown, the various types of circuitry and application functionality DC&A, MC&A, and IC&A, previously described with reference to FIG. 1, are implemented by the video player systems 308, 310, 312, and 314. As will be described further with reference to FIGS. 12 through 15, the functionality of these circuitries/applications may be distributed across multiple devices.

Figure 4:
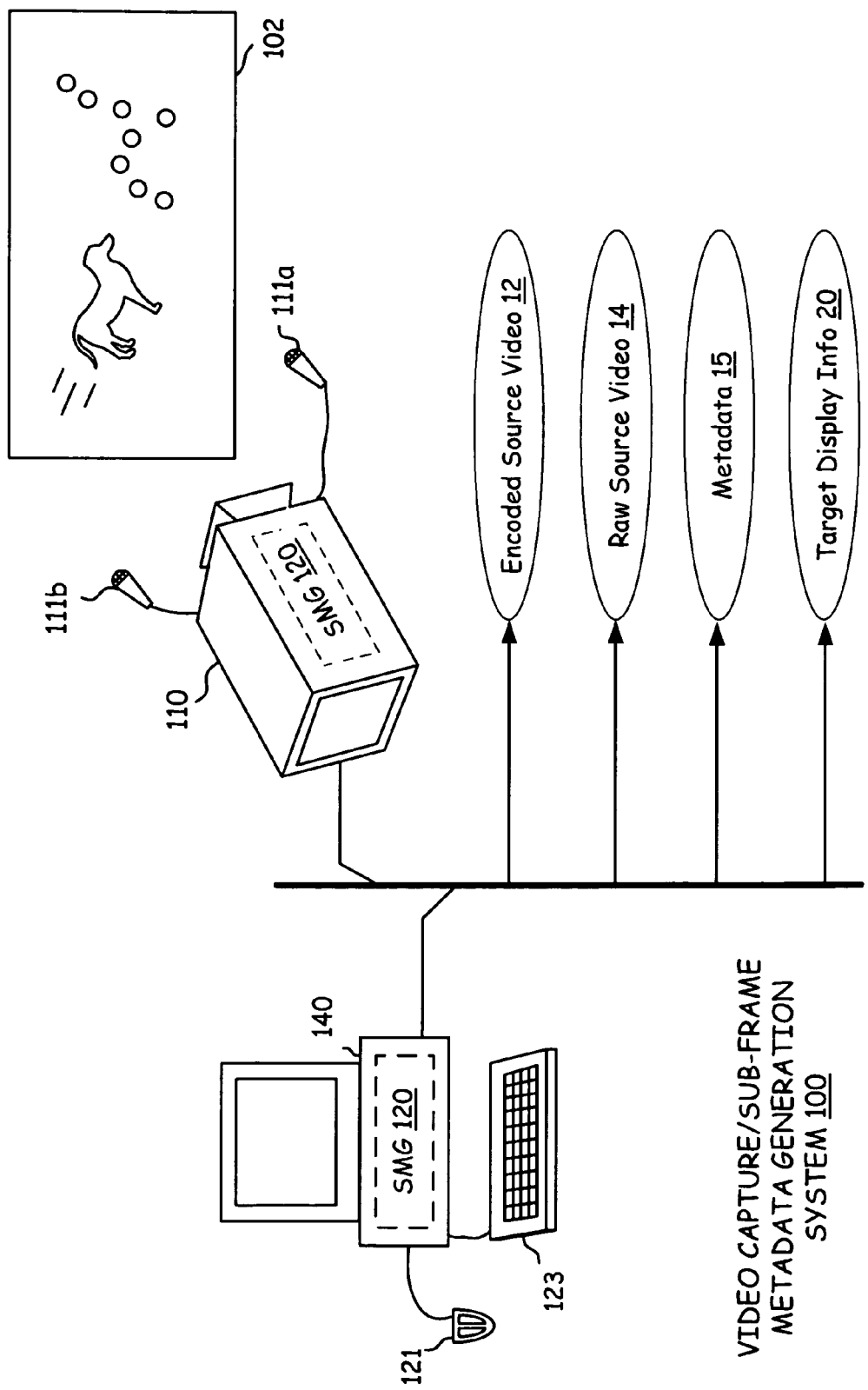
FIG. 4 is a system diagram illustrating a video capture/sub-frame metadata generation system constructed according to an embodiment of the present invention.

FIG. 4 is a system diagram illustrating a video capture/sub-frame metadata generation system constructed according to an embodiment of the present invention. The video capture/sub-frame metadata system 100 of FIG. 4 includes a camera 110 and an SMG system 120. The video camera 110 captures an original sequence of full frames of video data relating to scene 102. The video camera 110 may also capture audio via microphones 111A and 111B. The video camera 110 may provide the full frames of video data to console 140 or may execute the SMG system 120. The SMG system 120 of the video camera 110 or console 140 receives input from a user via a user input device 121 or 123. Based upon this user input, the SMG system 120 displays one or more sub frames upon a video display that also illustrates the sequence of full frames of video data. Based upon the sub frames created from user input and additional information, the SMG system 120 creates metadata 15. The video data output of the video capture/sub frame metadata generation system 100 is one or more of the encoded source video 12 or raw source video 14. The video capture/sub frame metadata generation 100 also outputs metadata 15 that may be similar display metadata 16 and/or target display metadata 18. The video capture/sub-frame metadata generation system 100 may also output target display information 20.

The sequence of original video frames captured by the video camera 110 is of scene 102. The scene 102 may be any type of a scene that is captured by a video camera 110. For example, the scene 102 may be that of a landscape having a relatively large capture area with great detail. Alternatively, the scene 102 may be head shots of actors having dialog with each other. Further, the scene 102 may be an action scene of a dog chasing a ball. The scene 102 type typically changes from time to time during capture of original video frames.

With prior video capture systems, a user operates the camera 110 to capture original video frames of the scene 102 that were optimized for a "big-screen" format. With the present invention, the original video frames will be later converted for eventual presentation by target video players having respective video displays. Because the sub-frame metadata generation system 120 captures differing types of scenes over time, the manner in which the captured video is converted to create sub-frames for viewing on the target video players also changes over time. The "big-screen" format does not always translate well to smaller screen types. Therefore, the sub-frame metadata generation system 120 of the present invention supports the capture of original video frames that, upon conversion to smaller formats, provide high quality video sub-frames for display on one or more video displays of target video players.

The encoded source video 12 may be encoded using one or more of a discrete cosine transform (DCT)-based encoding/compression formats (e.g., MPEG-1, MPEG-2, MPEG-2-enhanced for HD, MPEG-4 AVC, H.261 and H.263), motion vectors are used to construct frame or field-based predictions from neighboring frames or fields by taking into account the inter-frame or inter-field motion that is typically present. As an example, when using an MPEG coding standard, a sequence of original video frames is encoded as a sequence of three different types of frames: "I" frames, "B" frames and "P" frames. "I" frames are intra-coded, while "P" frames and "B" frames are inter-coded. Thus, I-frames are independent, i.e., they can be reconstructed without reference to any other frame, while P-frames and B-frames are dependent, i.e., they depend upon another frame for reconstruction. More specifically, P-frames are forward predicted from the last I-frame or P-frame and B-frames are both forward predicted and backward predicted from the last/next I-frame or P-frame. The sequence of IPB frames is compressed utilizing the DCT to transform N×N blocks of pixel data in an "I", "P" or "B" frame, where N is usually set to 8, into the DCT domain where quantization is more readily performed. Run-length encoding and entropy encoding are then applied to the quantized bitstream to produce a compressed bitstream which has a significantly reduced bit rate than the original uncompressed video data.

Figure 5:
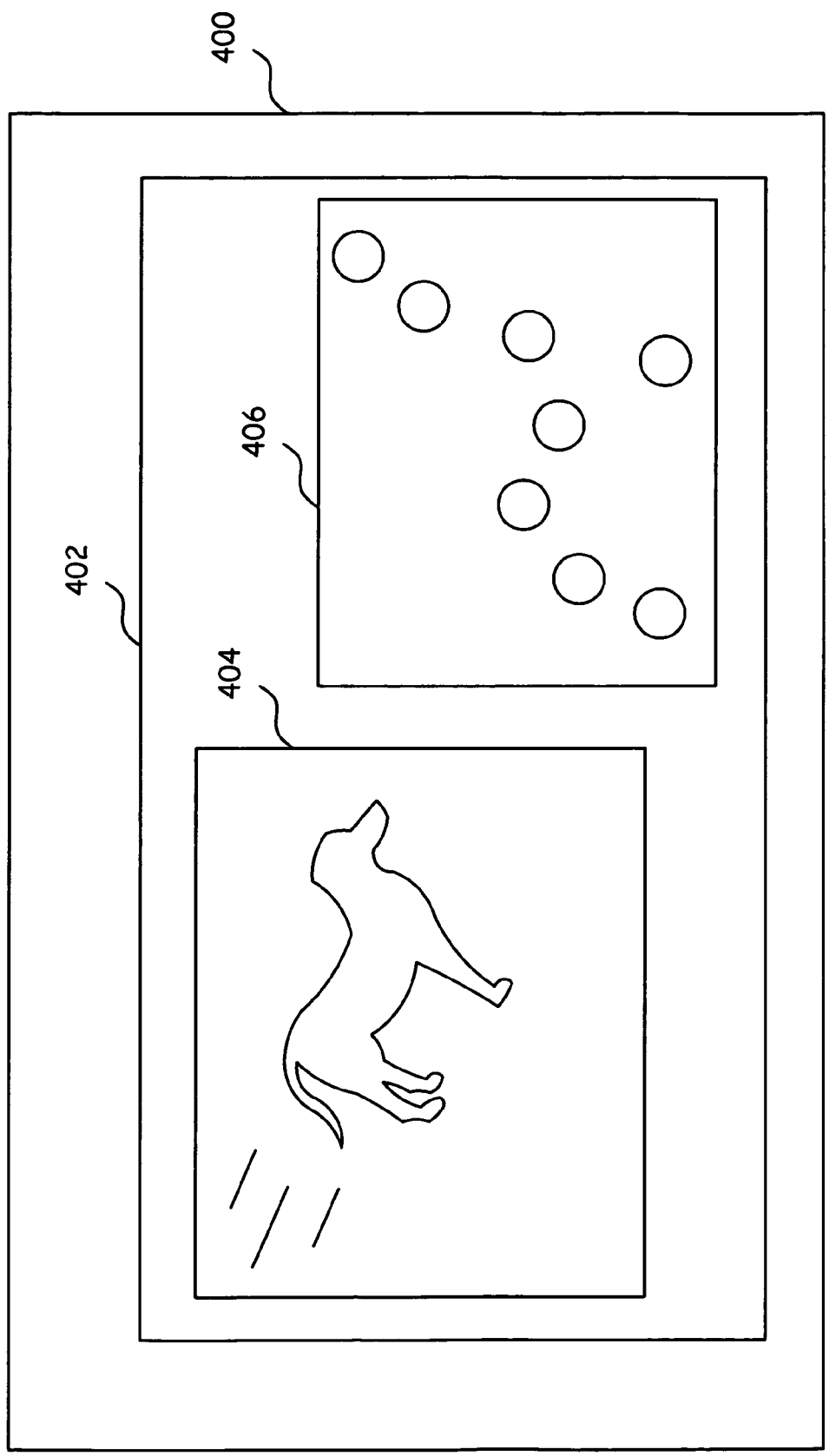
FIG. 5 is a diagram illustrating exemplary original video frames and corresponding sub-frames.

FIG. 5 is a diagram illustrating exemplary original video frames and corresponding sub-frames. As is shown, the video display 400 has a viewing area that displays the sequence of original video frames representing the scene 102 of FIG. 4. According to the embodiment of FIG. 5, the SMG system 120 is further operable to respond to additional signals representing user input by presenting, in addition to sub-frame 402, additional sub-frames 404 and 406 on the video display 400 in association with the sequence of original video frames. Each of these sub-frames 402 would have an aspect ratio and size corresponding to one of a plurality of target video displays. Further, the SMG system 120 produces metadata 15 associated with each of these sub-frames 402, 404, and 406. The metadata 15 that the sub-frame metadata generation system 120 generates that is associated with the plurality of sub-frames 402, 404, and 406 enables a corresponding target video display to produce a corresponding presentation on its video display. In the example of FIG. 5, the SMG system 120 includes a single video display 400 upon which each of the plurality of sub-frames 402, 404, and 406 are displayed. In another embodiment, each of the plurality of sub-frames generated by the video processing system may be independently displayed on a corresponding target video player.

With the example of FIG. 5, at least two of the sub-frames 404 and 406 of the set of sub-frames may correspond to a single frame of the sequence of original video frames. Thus, for example, with a particular target video player, sub-frames 404 and 406 and the related video information contained therein may be presented at differing times on a single target video player. With the example of FIG. 5, a first portion of video presented by the target video player may show a dog chasing a ball as contained in sub-frame 404 while a second portion of video presented by the target video player shows the bouncing ball as it is illustrated in sub-frame 406. Thus, with this example, video sequences of a target video player that are adjacent in time are created from a single sequence of original video frames.

Further, with the example of FIG. 5, at least two sub-frames of the set of sub-frames may include an object whose spatial position varies over the sequence of original video frames. In such frames, the spatial position of the sub-frame 404 that identifies the dog would vary over the sequence of original video frames with respect to the sub-frame 406 that indicates the bouncing ball. Further, with the example of FIG. 5, two sub-frames of the set of sub-frames may correspond to at least two different frames of the sequence of original video frames. With this example, sub-frames 404 and 406 may correspond to differing frames of the sequence of original video frames displayed on the video display 400. With this example, during a first time period, sub-frame 404 is selected to display an image of the dog over a period of time. Further, with this example, sub-frames 406 would correspond to a different time period to show the bouncing ball. With this example, at least a portion of the set of sub-frames 404 and 406 may correspond to a sub-scene of a scene depicted across the sequence of original video frames. This sequence depicted may be depicted across the complete display 400 or sub-frame 402.

Figure 6:
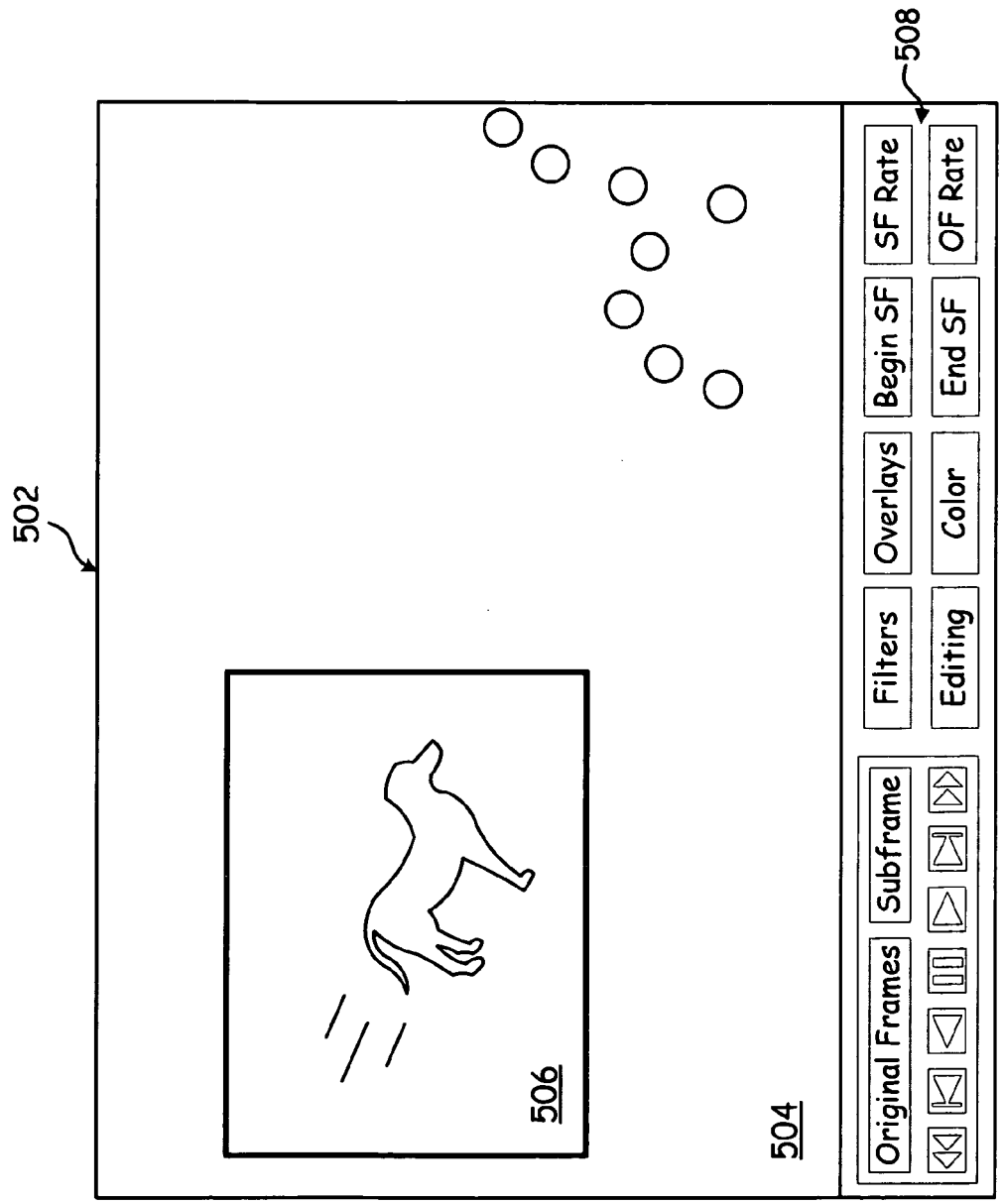
FIG. 6 is a diagram illustrating an embodiment of a video processing system display providing a graphical user interface that contains video editing tools for creating sub-frames.

FIG. 6 is a diagram illustrating an embodiment of a video processing system display providing a graphical user interface that contains video editing tools for creating sub-frames. On the video processing display 502 is displayed a current frame 504 and a sub-frame 506 of the current frame 504. The sub-frame 506 includes video data within a region of interest identified by a user. Once the sub-frame 506 has been identified, the user may edit the sub-frame 506 using one or more video editing tools provided to the user via the GUI 508. For example, as shown in FIG. 6, the user may apply filters, color correction, overlays, or other editing tools to the sub-frame 506 by clicking on or otherwise selecting one of the editing tools within the GUI 508. In addition, the GUI 508 may further enable the user to move between original frames and/or sub-frames to view and compare the sequence of original sub-frames to the sequence of sub-frames.

Figure 7:
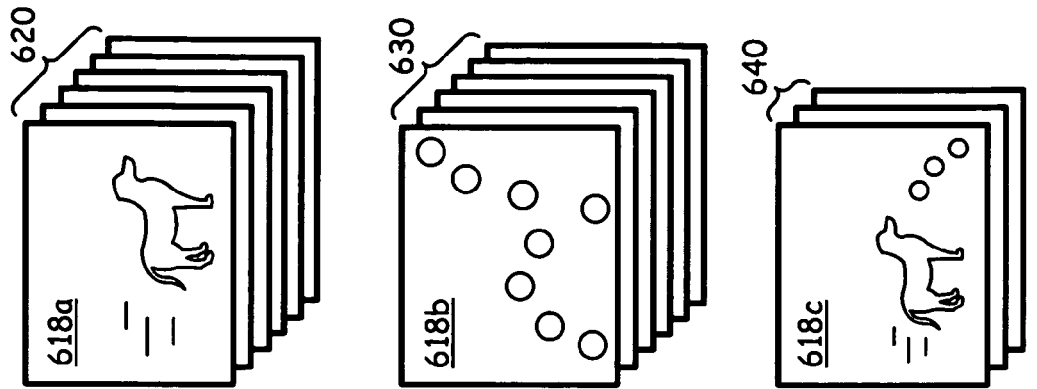
FIG. 7 is a diagram illustrating exemplary original video frames and corresponding sub-frames.
Figure 7:
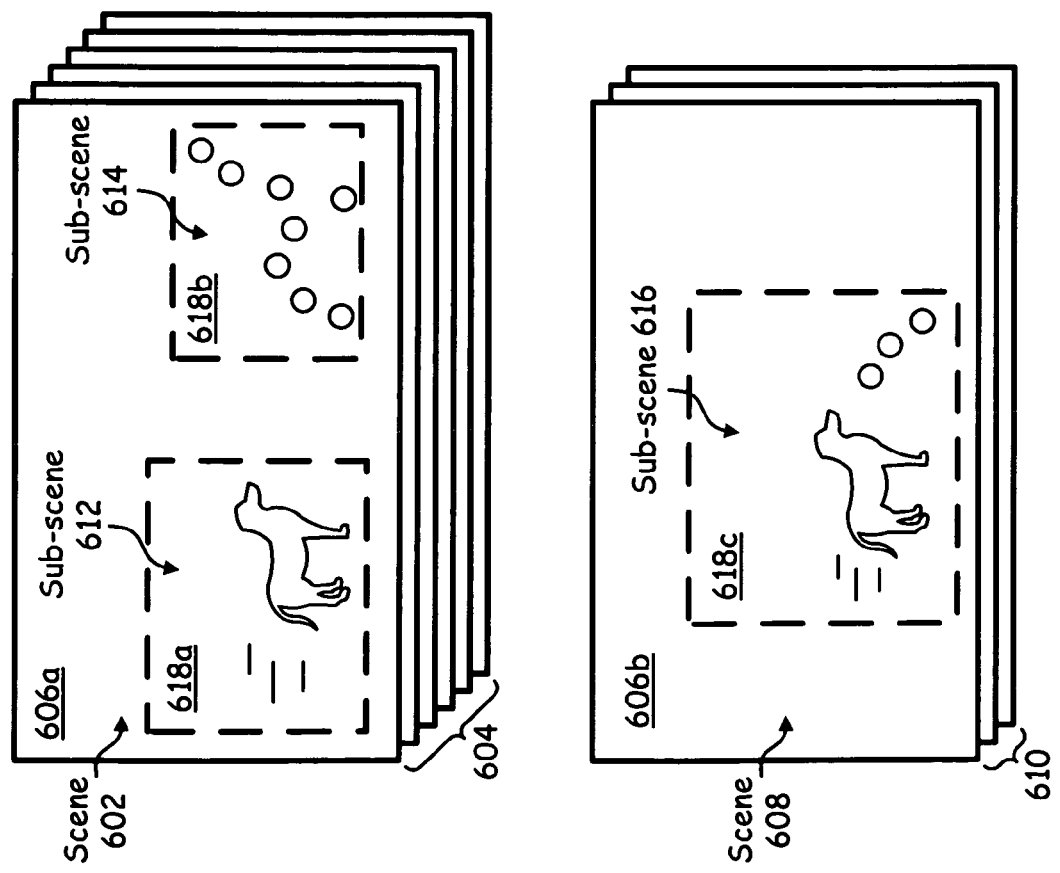

FIG. 7 is a diagram illustrating exemplary original video frames and corresponding sub-frames. In FIG. 7, a first scene 602 is depicted across a first sequence 604 of original video frames 606 and a second scene 608 is depicted across a second sequence 610 of original video frames 606. Thus, each scene 602 and 608 includes a respective sequence 604 and 610 of original video frames 606, and is viewed by sequentially displaying each of the original video frames 606 in the respective sequence 604 and 610 of original video frames 606.

However, to display each of the scenes 602 and 608 on a small video display without reducing the viewer's perceived video quality, each of the scenes 602 and 608 can be divided into sub-scenes that are separately displayed. For example, as shown in FIG. 7, within the first scene 602, there are two sub-scenes 612 and 614, and within the second scene 608, there is one sub-scene 616. Just as each scene 602 and 608 may be viewed by sequentially displaying a respective sequence 604 and 610 of original video frames 606, each sub-scene 612, 614, and 616 may also be viewed by displaying a respective sequence of sub-frames 618 (618a, 618b, and 618c).

For example, looking at the first frame 606a within the first sequence 604 of original video frames, a user can identify two sub-frames 618a and 618b, each containing video data representing a different sub-scene 612 and 614. Assuming the sub-scenes 612 and 614 continue throughout the first sequence 604 of original video frames 606, the user can further identify two sub-frames 618a and 618b, one for each sub-scene 612 and 614, respectively, in each of the subsequent original video frames 606a in the first sequence 604 of original video frames 606. The result is a first sequence 620 of sub-frames 618a, in which each of the sub-frames 618a in the first sequence 620 of sub-frames 618a contains video content representing sub-scene 612, and a second sequence 630 of sub-frames 618b, in which each of the sub-frames 618b in the second sequence 630 of sub-frames 618b contains video content representing sub-scene 614. Each sequence 620 and 630 of sub-frames 618a and 618b can be sequentially displayed. For example, all sub-frames 618a corresponding to the first sub-scene 612 can be displayed sequentially followed by the sequential display of all sub-frames 618b of sequence 630 corresponding to the second sub-scene 614. In this way, the movie retains the logical flow of the scene 602, while allowing a viewer to perceive small details in the scene 602.

Likewise, looking at the first frame 606b within the second sequence 610 of original video frames 606, a user can identify a sub-frame 618c corresponding to sub-scene 616. Again, assuming the sub-scene 616 continues throughout the second sequence 610 of original video frames 606, the user can further identify the sub-frame 618c containing the sub-scene 616 in each of the subsequent original video frames 606 in the second sequence 610 of original video frames 606. The result is a sequence 640 of sub-frames 618c, in which each of the sub-frames 618c in the sequence 640 of sub-frames 618c contains video content representing sub-scene 616.

Figure 8:
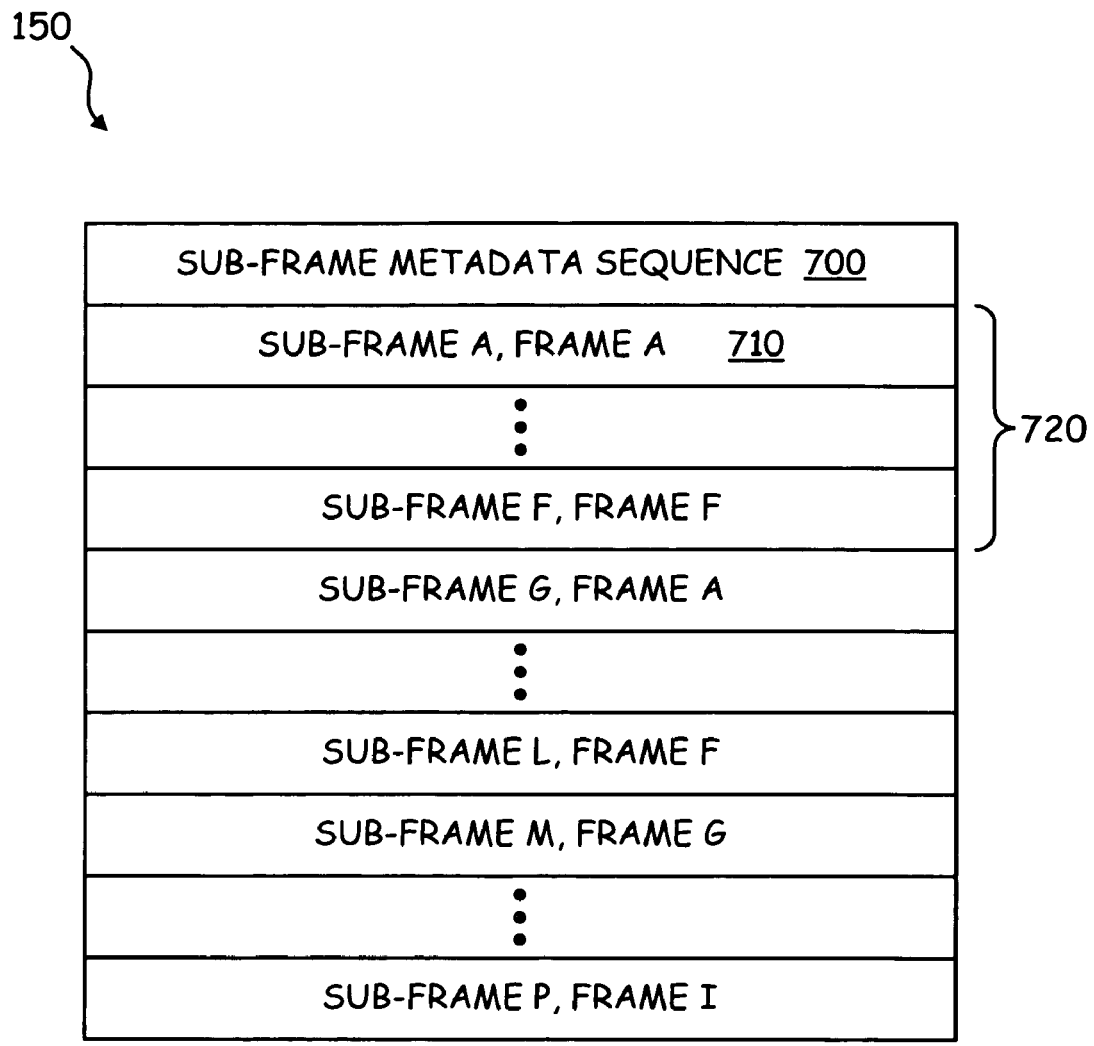
FIG. 8 is a chart illustrating exemplary sub-frame metadata for a sequence of sub-frames.

FIG. 8 is a chart illustrating exemplary sub-frame metadata for a sequence of sub-frames. Within the sub-frame metadata 150 shown in FIG. 8 is sequencing metadata 700 that indicates the sequence (i.e., order of display) of the sub-frames. For example, the sequencing metadata 700 can identify a sequence of sub-scenes and a sequence of sub-frames for each sub-scene. Using the example shown in FIG. 8, the sequencing metadata 700 can be divided into groups 720 of sub-frame metadata 150, with each group 720 corresponding to a particular sub-scene.

For example, in the first group 720, the sequencing metadata 700 begins with the first sub-frame (e.g., sub-frame 618a) in the first sequence (e.g., sequence 620) of sub-frames, followed by each additional sub-frame in the first sequence 620. In FIG. 8, the first sub-frame in the first sequence is labeled sub-frame A of original video frame A and the last sub-frame in the first sequence is labeled sub-frame F of original video frame F. After the last sub-frame in the first sequence 620, the sequencing metadata 700 continues with the second group 720, which begins with the first sub-frame (e.g., sub-frame 618b) in the second sequence (e.g., sequence 630) of sub-frames and ends with the last sub-frame in the second sequence 630. In FIG. 8, the first sub-frame in the second sequence is labeled sub-frame G of original video frame A and the last sub-frame in the first sequence is labeled sub-frame L of original video frame F. The final group 720 begins with the first sub-frame (e.g., sub-frame 618c) in the third sequence (e.g., sequence 640) of sub-frames and ends with the last sub-frame in the third sequence 640. In FIG. 8, the first sub-frame in the first sequence is labeled sub-frame M of original video frame G and the last sub-frame in the first sequence is labeled sub-frame P of original video frame I.

Within each group 720 is the sub-frame metadata for each individual sub-frame in the group 720. For example, the first group 720 includes the sub-frame metadata 150 for each of the sub-frames in the first sequence 620 of sub-frames. In an exemplary embodiment, the sub-frame metadata 150 can be organized as a metadata text file containing a number of entries 710. Each entry 710 in the metadata text file includes the sub-frame metadata 150 for a particular sub-frame. Thus, each entry 710 in the metadata text file includes a sub-frame identifier identifying the particular sub-frame associated with the metadata and references one of the frames in the sequence of original video frames.

Examples of editing information include, but are not limited to, a pan direction and pan rate, a zoom rate, a contrast adjustment, a brightness adjustment, a filter parameter, and a video effect parameter. More specifically, associated with a sub-frame, there are several types of editing information that may be applied including those related to: a) visual modification, e.g., brightness, filtering, video effects, contrast and tint adjustments; b) motion information, e.g., panning, acceleration, velocity, direction of sub-frame movement over a sequence of original frames; c) resizing information, e.g., zooming (including zoom in, out and rate) of a sub-frame over a sequence of original frames; and d) supplemental media of any type to be associated, combined or overlaid with those portions of the original video data that falls within the sub-frame (e.g., a text or graphic overlay or supplemental audio.

Figure 9:
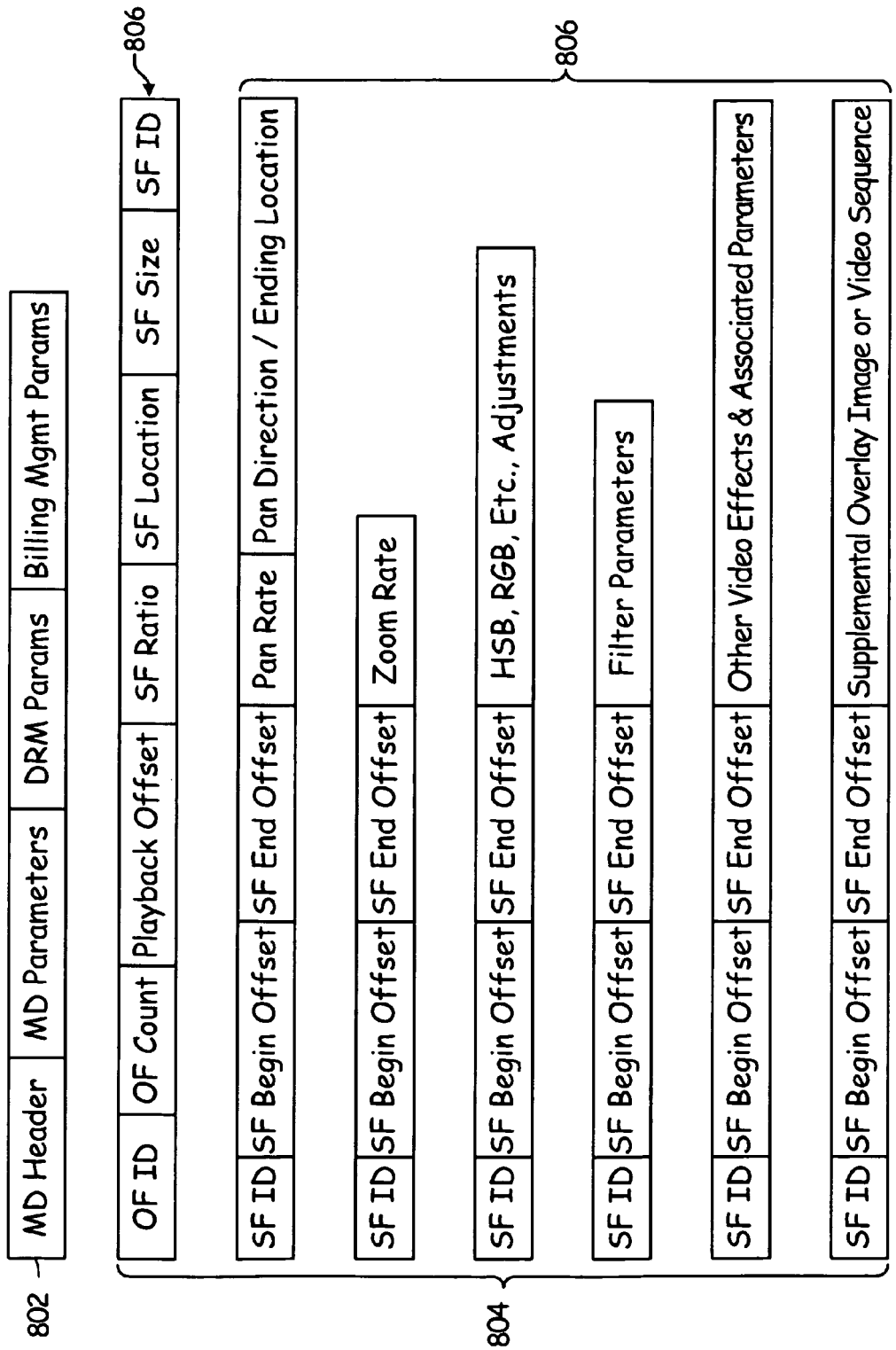
FIG. 9 is a chart illustrating exemplary sub-frame metadata including editing information for a sub-frame.

FIG. 9 is a chart illustrating exemplary sub-frame metadata including editing information for a sub-frame. The sub-frame metadata includes a metadata header 802. The metadata header 802 includes metadata parameters, digital rights management parameters, and billing management parameters. The metadata parameters include information regarding the metadata, such as date of creation, date of expiration, creator identification, target video device category/categories, target video device class(es), source video information, and other information that relates generally to all of the metadata. The digital rights management component of the metadata header 802 includes information that is used to determine whether, and to what extent the sub-frame metadata may be used. The billing management parameters of the metadata header 802 include information that may be used to initiate billing operations incurred upon use the metadata.

Sub-frame metadata is found in an entry 804 of the metadata text file. The sub-frame metadata 150 for each sub-frame includes general sub-frame information 806, such as the sub-frame identifier (SF ID) assigned to that sub-frame, information associated with the original video frame (OF ID, OF Count, Playback Offset) from which the sub-frame is taken, the sub-frame location and size (SF Location, SF Size) and the aspect ratio (SF Ratio) of the display on which the sub-frame is to be displayed. In addition, as shown in FIG. 9, the sub-frame information 804 for a particular sub-frame may include editing information 806 for use in editing the sub-frame. Examples of editing information 806 shown in FIG. 9 include a pan direction and pan rate, a zoom rate, a color adjustment, a filter parameter, a supplemental over image or video sequence and other video effects and associated parameters.

Figure 10:
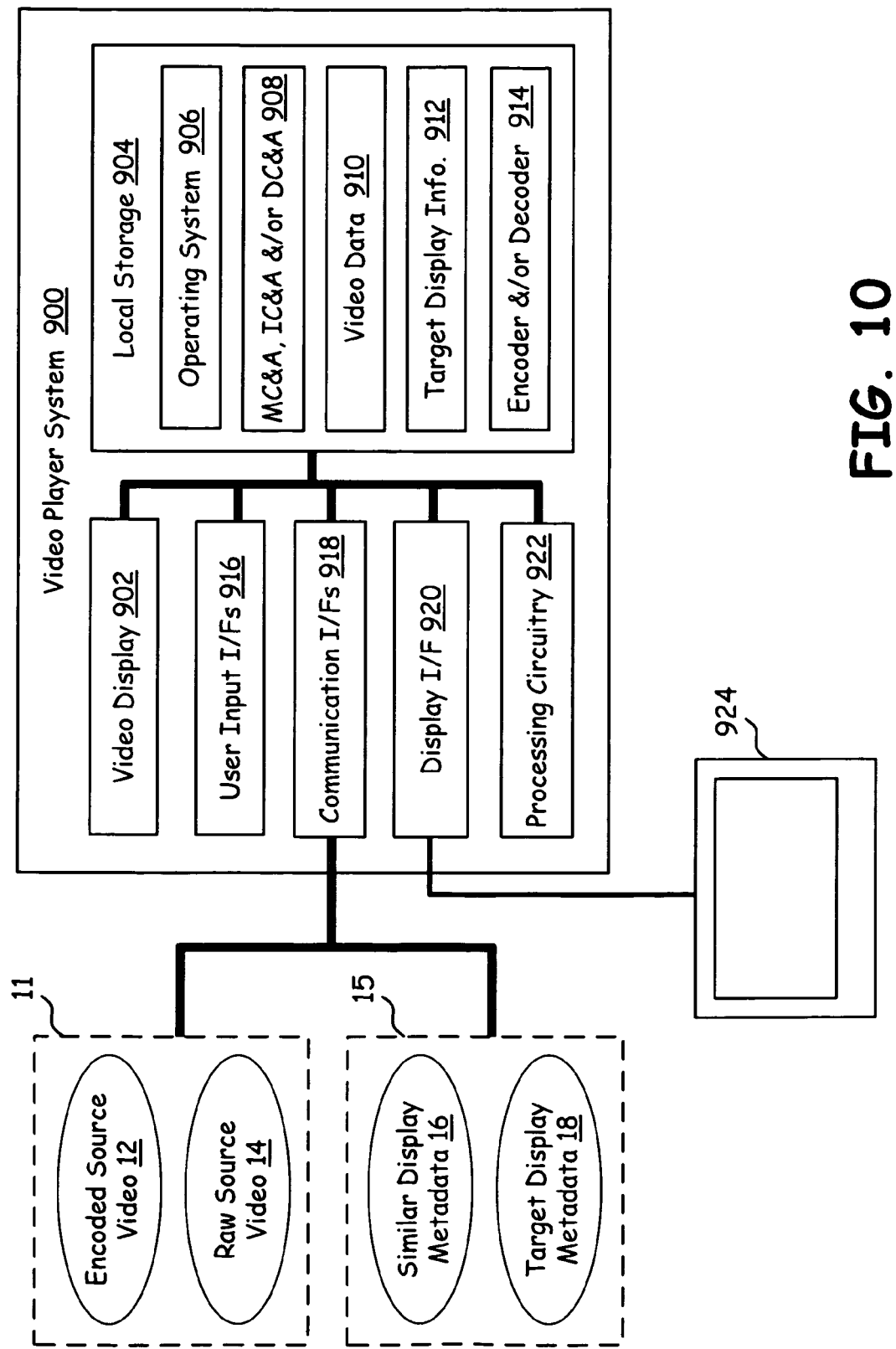
FIG. 10 is a block diagram illustrating a video player system constructed according to an embodiment of the present invention.

FIG. 10 is a block diagram illustrating a video player system constructed according to an embodiment of the present invention. The video player system 900 includes a video display 902, local storage 904, user input interface(s) 916, communication interface(s) 918, a display interface 920, and processing circuitry 922. In this particular embodiment, the video player system 900 includes the video display 902 and the other components within a shared housing. However, in other embodiments such as video player systems 20 and 28 of FIG. 1, the video player system 900 services a video display 924 that resides in a different housing. The video display 924 may even reside in a different locale that is linked by a communication interface to the video player system 900. With the video display 924 remotely located, display interface 920 of the video player system 900 communicates with the video display 924 across a communication link.

The video player system 900 receives source video 11 and metadata 15 via its communication interface(s) 918. The video player system 900 receives user input via its user input interface 916. Processing circuitry 922 may be a general purpose processor such as a microprocessor or digital signal processor, a application specific integrated circuit, or another type of processing circuitry that is operable to execute software instructions and to process data. Local storage 904 includes one or more of random access memory, read only memory, optical drive, hard disk drive, removable storage media, or another storage media that can store instructions and data. The local storage 904 stores an operating system 906, video player software 908, video data 910, target display information 912, and encoder &/or decoder software 914. The video player software 908 includes one or more of the MC&A, IC&A &/or DC&A functionality.

In one particular operation according to the present invention, the video player system 900 receives encoded source video 12 and produces output to video display 902 or 924. The processing circuitry 922, running the video player software 908 and the encoder software 914, produces a sequence of full frames of video data from the encoded source video 12. The video player software 908 includes a sub-frame processor application that generates, by processing the sequence of full frames of video data, both a first sequence of sub-frames of video data based on first location and sizing information and a second sequence of sub-frames of video data based on second location and sizing information. The first location and sizing information and the second location of sizing information together make up the metadata 15. With this particular operation of the video player system 900, the display interface 920 delivers the first sequence and second sequence of sub-frames of video data for full frame presentation on display 902 or 924.

Similar operations may be employed using raw source video 14. Similar display metadata 16 and/or target display metadata 18 may be used with these operations. In another particular operation, the video player system 900 processes the target display information 912 to tailor the first sequence and second sequence of sub-frames of video to produce video data particularly for either the video display 902 or the video display 924.

Figure 11:
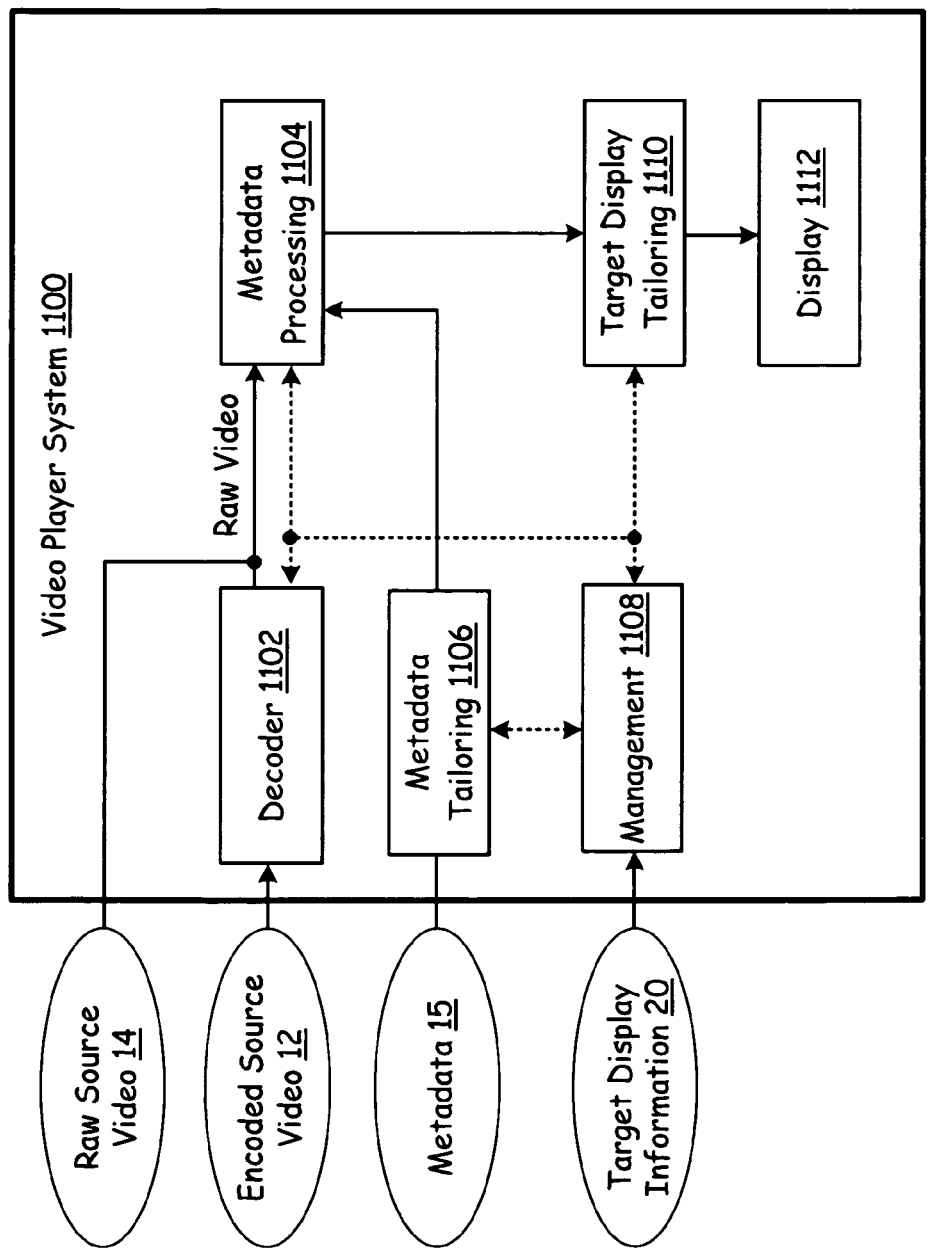
FIG. 11 is a block diagram illustrating a video player system constructed according to an embodiment of the present invention.

FIG. 11 is a block diagram illustrating a video player system constructed according to an embodiment of the present invention. With the particular structure of FIG. 11, the video player system 1100 includes a decoder 1102, metadata processing circuitry 1104, metadata tailoring circuitry 1106, management circuitry 1108, target display tailoring circuitry 1110, and a display 1112. The Decoder 1102 receives encoded source video 12 and produces raw video. Alternatively, the raw source video 14 may be directly provided as an input to the video player system 1100.

The management circuitry 1108 receives target display information 20 and communicatively couples within the video player system 1100 to metadata tailoring circuitry 1106, decoder 1102, metadata processing circuitry 1104, and target display tailoring circuitry 1110. The metadata tailoring circuitry 1106 receives metadata 15. Based upon input from the management circuitry 1108, the metadata tailoring circuitry 1106 modifies the metadata so that it is more particularly suited for the display 1112. In such case, the metadata 15 received by the metadata tailoring circuitry 1106 may be the similar display metadata 16 illustrated in FIG. 1. The target display information 20 includes information respective to display 1112. Based upon the target display information 20, the management circuitry 1108 provides input to metadata tailoring circuitry 1106, which the metadata tailoring circuitry 1106 uses to modify the metadata 15.

The Metadata Processing Circuitry 1104 receives the raw video, input from metadata tailoring circuitry 1106, and input from management circuitry 1108. The Metadata processing circuitry 1104 processes its inputs and produces output to target display tailoring circuitry 1110. The target display tailoring circuitry 1110 alters the input received from metadata processing circuitry 1104 and produces an output to display 1112.

In a particular operation of the video player system 1100, the decoder circuitry 1102 receives encoded source video 12 to produce a sequence of full frames of video data (raw video). The metadata Processing 1104 (pre-processing circuitry), pursuant to sub-frame information (output of metadata tailoring circuitry 1106), generates a plurality of sequences of sub-frames of video data from the sequences of full-frames of video data (raw video). The plurality of sequences of sub-frames of video data include a first sequence of sub-frames of video data that have a different point within the sequence of full-frames and video in that of a second sequence of the plurality of sequences of sub-frames of video data also produced within the metadata processing circuitry 1104. The metadata processing 1104 also assembles the first sequence of plurality of sequences of sub-frames of video data with the second sequence of plurality of sequences of sub-frames of video data to produce output to the target display tailoring circuitry 1110.

The target display tailoring circuitry 1110 (post-processing circuitry) modifies the plurality of sequences of sub-frames of video data to produce an output. The modification operations perform the target display tailoring circuitry 1110 are based upon input received from a management circuitry 1108. The input received from management circuitry 1108 by the target display tailoring circuitry 1110 is based upon target display information 20. The output produced by the target display tailoring circuitry 1110 is delivered to display 1112 for subsequent presentation.

According to operations of the present invention, the raw source video 14 and/or encoded source video 12 has a source video resolution. The source video resolution may be referred to as a first resolution. However, the plurality of sequences of sub-frames of video data produced by the metadata processing circuitry 1104 would have a second resolution that corresponds to the property of display 1112. In most cases, the second resolution would be lesser than that of the first resolution. Such would typically be the case because the size of display 1112 would be less than the size of display intended for presentation of the source video. Further, the display 1112 may have a different aspect ratio than a display intended to display source video 12 and 14. Thus, while the sequence of full-frame of video data 12 and 14 has a first aspect ratio, the output produced by metadata processing 1104 and target display tailoring circuitry 1110 would have a second aspect ratio that differs from the first aspect ratio.

In some embodiments of the video player system 1100, components 1102 through 1112 are contained in a single housing. Alternatively, the display 1112 may be disposed in a housing separate from components 1102 through 1110. In further embodiments, the components 1102 though 1112 may be combined in/or separated in many different devices constructs. Various of these constructs will be described with references to FIGS. 12 through 15.

Figure 12:
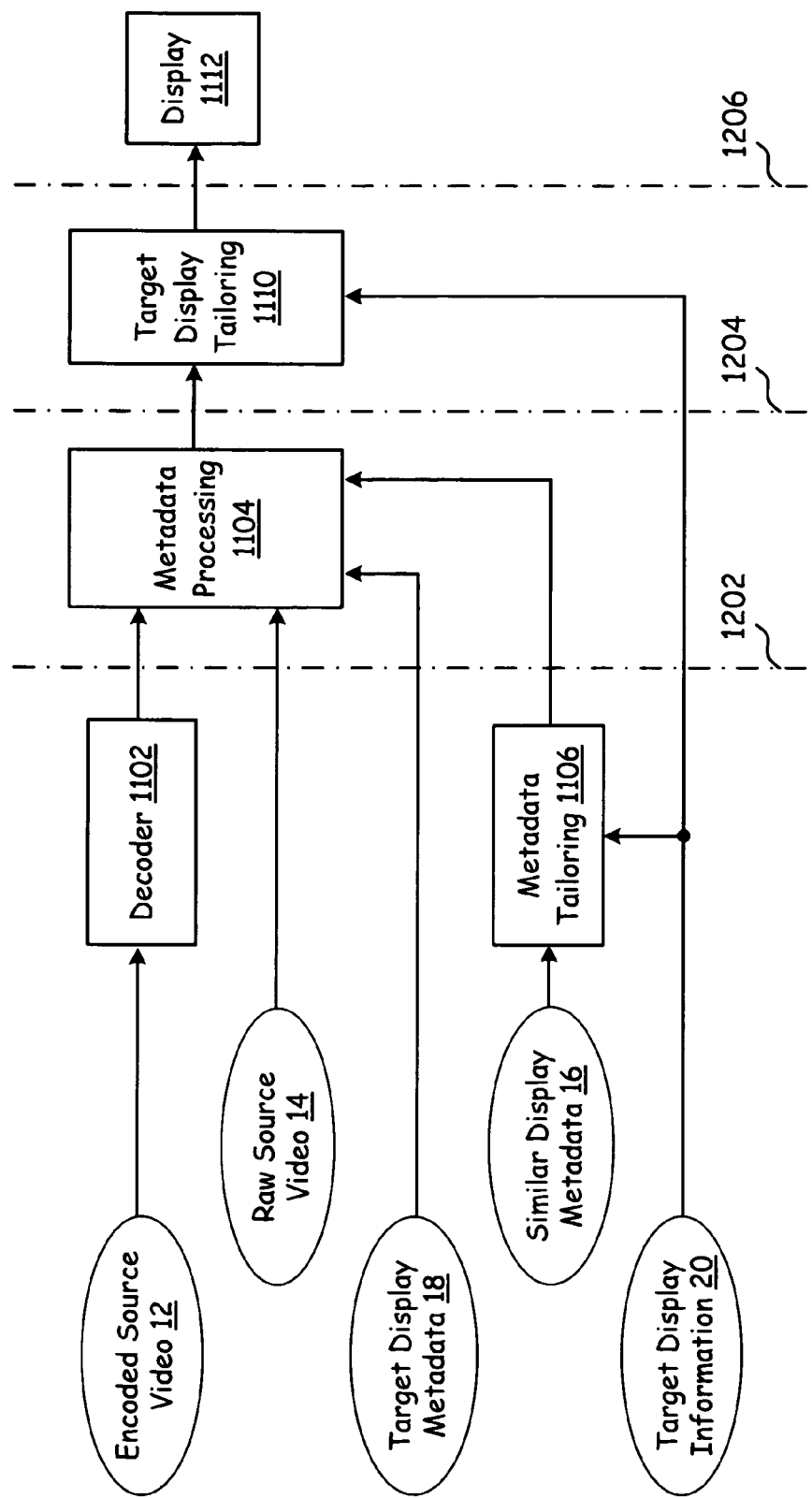
FIG. 12 is a schematic block diagram illustrating a first embodiment of a distributed video player system according to the present invention.

FIG. 12 is a schematic block diagram illustrating a first embodiment of a distributed video player system according to the present invention. With the embodiment of FIG. 12, lines of separation 1202, 1204, and 1206 of functional components of the video player system are displayed. These lines of separation 1202, 1204, and 1206 indicate a separation among distinct processing devices, distinct processing elements of a single device, and/or distinct processing operations in time. Particularly, one of the separations of 1202 separates decoder 1102 and metadata tailoring circuitry 1106 from other components of the video player circuitry. Further, the line of separation 1204 separates metadata processing circuitry 1104 from target display tailoring circuitry 1110. Further, line of separation 1206 separates target display tailoring circuitry 1110 from display 1112.

The components of FIG. 12 are similar to the components previously illustrated with reference to FIG. 11 and have retained common numbering where appropriate. With this common numbering and common functionality scheme, decoder 1102, metadata processing circuitry 1104, metadata tailoring circuitry 1106, target display tailoring circuitry 1110, and display 1112 receive same or similar inputs as those illustrated in FIG. 11 and implement or execute same in/or similar functionalities. The lines of separation 1202, 1204, and 1206 illustrate how the functions performed by the various elements 1102 through 1112 can be separated from one another in a physical sense, a logical sense, and/or a temporal sense.

Figure 13:
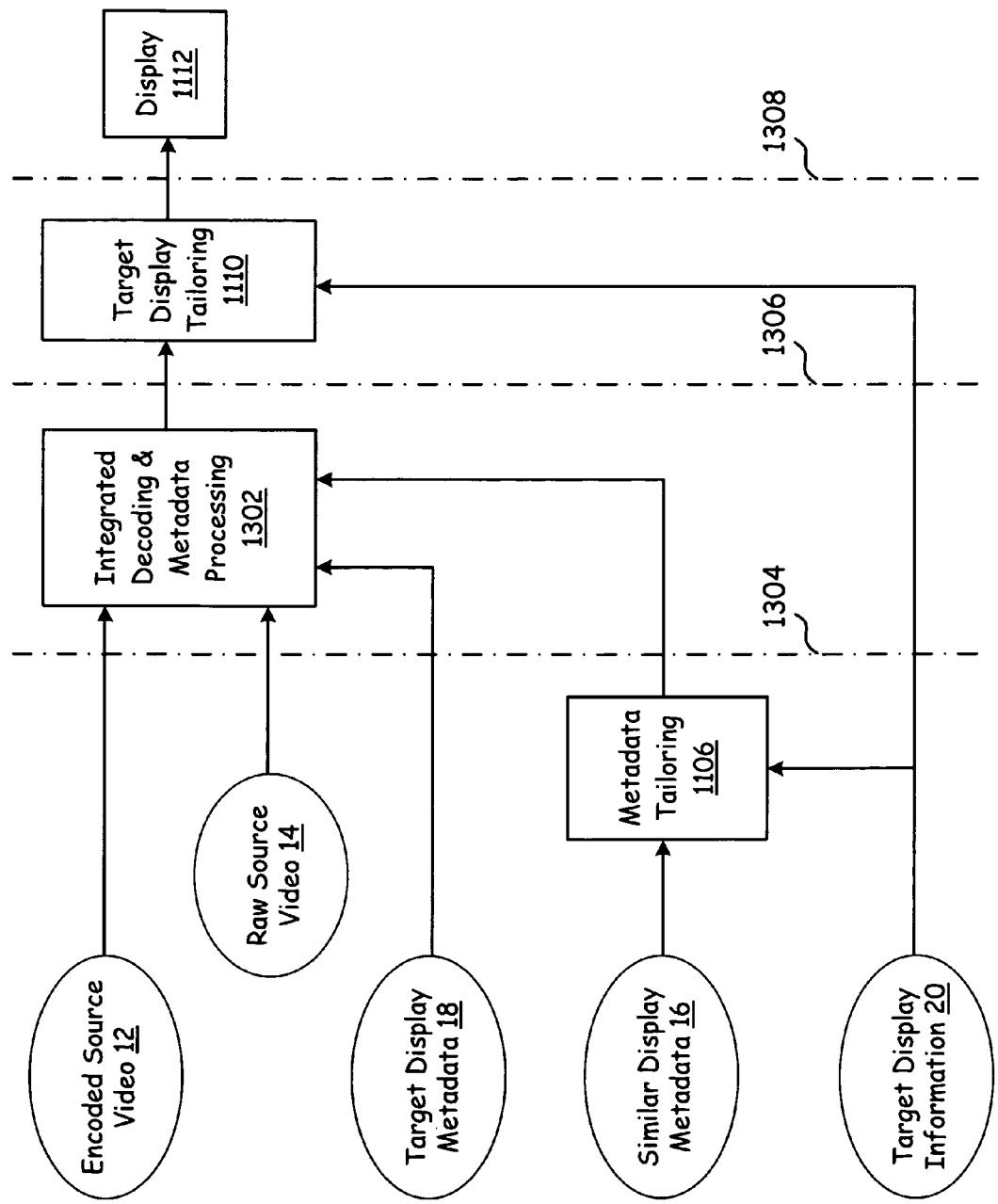
FIG. 13 is a schematic block diagram illustrating a second embodiment of a distributed video player system according to the present invention.

FIG. 13 is a schematic block diagram illustrating a second embodiment of a distributed video player system according to the present invention. As contrasted to the structures of FIG. 11 and FIG. 12, an integrated decoding and metadata processing circuitry 1302 performs both decoding and metadata processing operations. The integrated decoding and metadata processing circuitry 1302 receives encoded source video 12, raw source video 14, and target display metadata 18. In particular operations, the integrated decoding and metadata processing circuitry 1302 would receive one of encoded source video 12 and raw source video 14 for any particular sequence of full-frames of video data. The integrated decoding and metadata processing circuitry/functionality 1302 also receives input from the metadata tailoring circuitry 1106. The metadata tailoring functionality 1106 receives similar display metadata 16 and target display information 20. The metadata tailoring circuitry 1106 modifies similar display metadata 16 based upon target display information 20 to produce tailored metadata. The tailored metadata produced by metadata tailoring circuitry 1106 may be used in conjunction with or in lieu of the use of target display metadata 18.

The output of integrated decoding and metadata processing circuitry 1302 is received by target display tailoring circuitry 1110 that further modifies or tailors the plurality of sub-frames of video data produced by the integrated decoding and metadata processing 1302 based upon target display information 20 and produces output to display 1112. Lines of separations 1304, 1306, and/or 1308 illustrate how the integrated decoding and metadata processing circuitry 1302, the target display tailoring circuitry 1110, and the display 1112 may be separated from one another in a physical sense, a logical sense, and/or a temporal sense.

Figure 14:
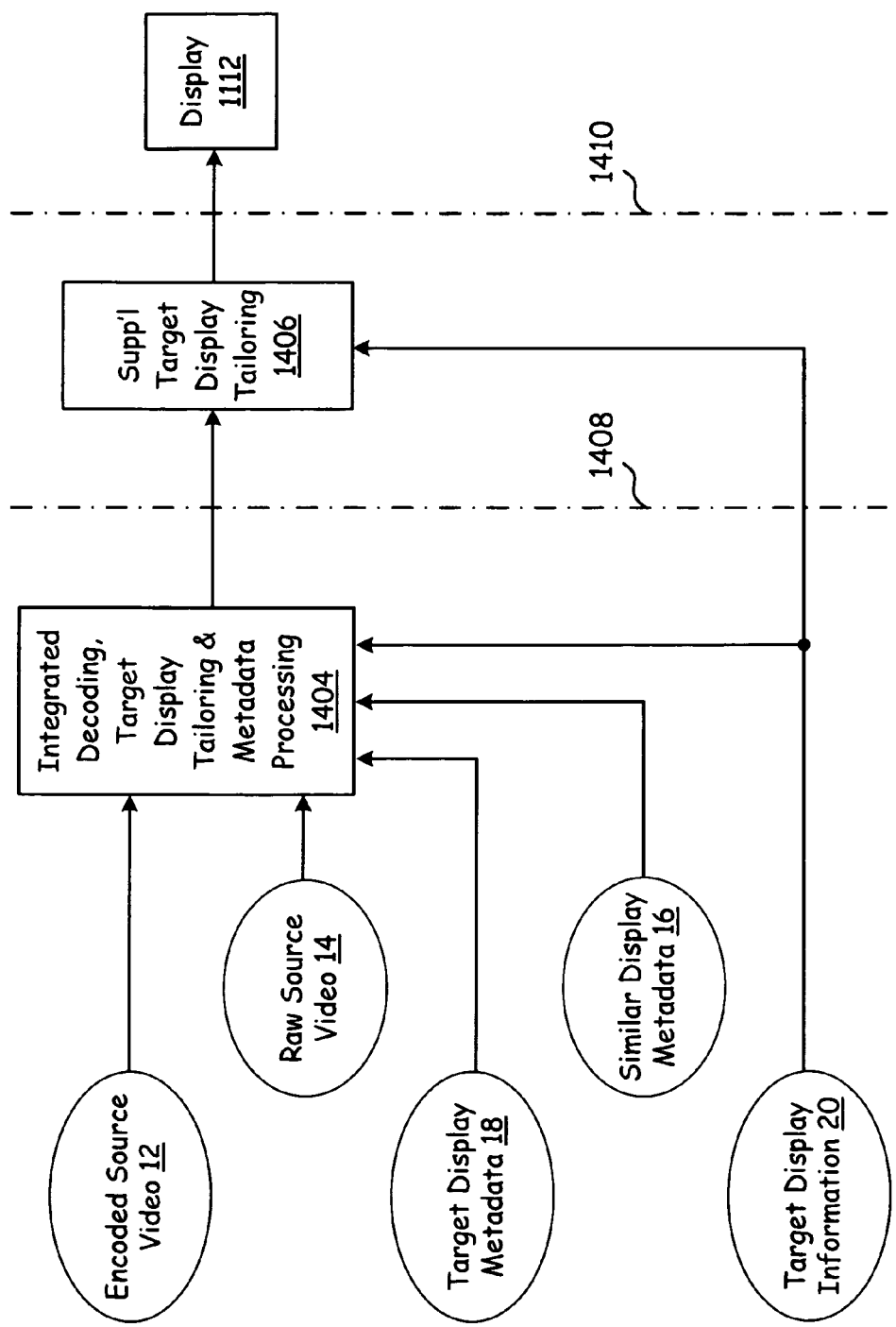
FIG. 14 is a schematic block diagram illustrating a third embodiment of a distributed video player system according to the present invention.

FIG. 14 is a schematic block diagram illustrating a third embodiment of a distributed video player system according to the present invention. The video player system illustrated includes integrated decoding, target display tailoring, and metadata processing circuitry 1404, supplemental target display tailoring circuitry 1406, and display 1112. The integrated decoding, target display tailoring, and metadata processing circuitry 1404 receives encoded source video 12, raw source video 14, target display metadata 18, similar display metadata 16, and/or target display information 20. Based upon the decoding of encoded source video 12 or directly from the raw source video 14, the integrated decoding, target display tailoring and metadata processing circuitry 1404 processes a sequence of full-frames of video data of the source video. Such processing is performed based upon the metadata 16 or 18 and/or the target display information 20. The integrated decoding, target display tailoring, and metadata processing circuitry 1404 produces a plurality of sequences of sub-frames of video data to the supplemental target display tailoring circuitry 1406. The supplemental target display tailoring 1406 performs additional tailoring of the plurality of sequences of sub-frames of video data based upon target display information 20. Such target tailoring includes modifying the plurality of sequences of sub-frames of video data particularly for display 1112. Lines of separation 1408, and 1410 illustrate how the integrated decoding, target display tailoring, and metadata processing circuitry 1404, the supplemental target display tailoring circuitry 1406, and the display 1202 may be separated from one another in a physical sense, a logical sense, and/or a temporal sense.

Figure 15:
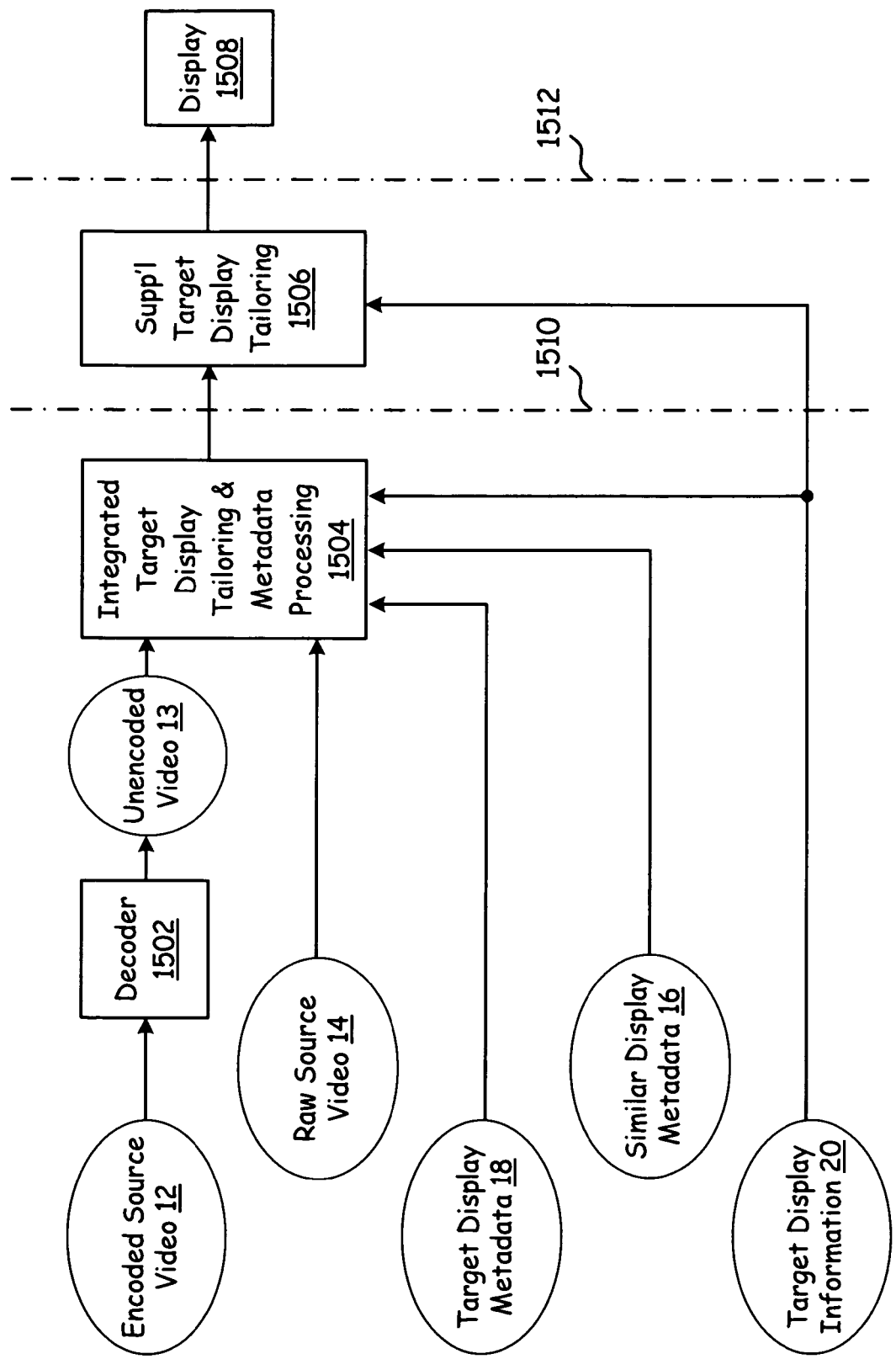
FIG. 15 is a schematic block diagram illustrating a fourth embodiment of a distributed video player system according to the present invention.

FIG. 15 is a schematic block diagram illustrating a fourth embodiment of a distributed video player system according to the present invention. Decoder 1502 receives encoded source video 12 and produces unencoded video 13. The unencoded video 13 and/or raw source video 14 is received and processed by integrated target display tailoring and metadata processing circuitry 1504. The integrated target display tailoring and metadata processing circuitry 1504 further receives target display metadata 18, similar display metadata 16, and/or target display information 20. The unencoded video 13 or raw source video 14 include a sequence of full-frames of video data. The integrated target display tailoring and metadata processing circuitry 1504 processes the sequence of full-frames of video data based upon one or more the target display metadata 18, the similar display metadata 16, and the target display information 20 to produce a plurality of sequences of sub-frames of video data to supplemental target display tailoring circuitry 1506. The supplemental target display tailoring circuitry 1506 modifies the plurality of sequences of sub-frames of video data based upon the target display information 20 to produce an output that is tailored to display 1508. The display 1508 receives the output of supplemental target display tailoring 1506 and displays the video data content contained therein.

The functions of blocks 1504, 1506, and 1508 may be separated from one another functionality, physically, and/or temporally. For example, in one embodiment, decoder 1502 and integrated target display tailoring and metadata processing circuitry 1504 may be executed by a single processing device. With this embodiment, the supplemental target display tailoring circuitry 1506 may be included with the display 1508.

In other embodiments, blocks 1502, 1504, 1506, and 1508 may reside within differing housings, within different locations, may be executed by different functional elements, and/or may be executed at differing times. Thus, lines 1510 and 1512 may represent physical boundaries, functional boundaries, and/or temporal boundaries.

Figure 16:
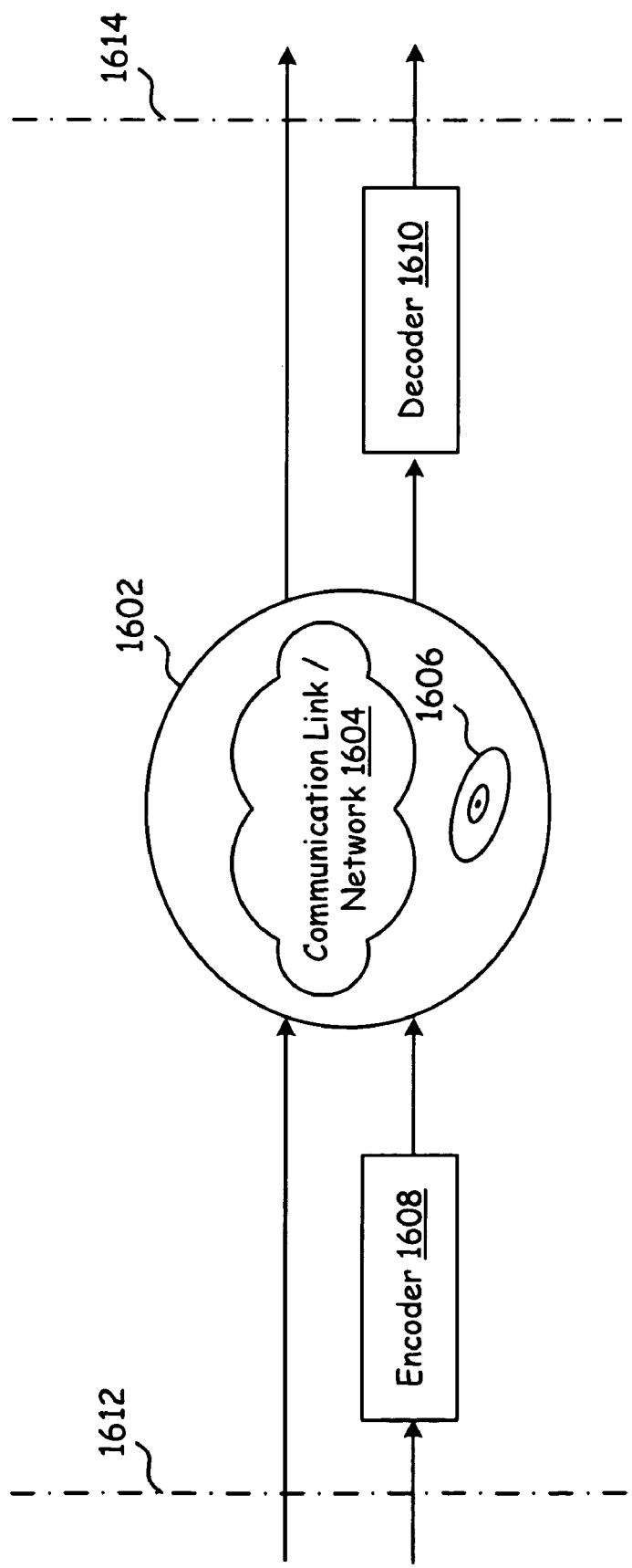
FIG. 16 is a system diagram illustrating techniques for transferring video data, metadata, and other information within a distributed video player system according to the present invention.

FIG. 16 is a system diagram illustrating techniques for transferring video data, metadata, and other information within a distributed video player system according to the present invention. The manner in which the various components of FIGS. 12 through 15 are coupled is shown in FIG. 16. Communication transfer 1602 may include a communication link/network connection 1604 and/or a physical media 1606. Lines of demarcation 1612 and 1614 may comprise any of lines demarcation 1202 through 1206, 1304 through 1308, 1408 through 1410, and/or 1510 through 1512. In such case, information passes across these lines via the communication link/network 1604 or media 1606.

With one particular operation, data is transferred in an unencoded format. However, in another embodiment, the information is encoded by encoder 1608, transferred via communication link/network connection 1604, and then decoded by decoder 1610 prior to subsequent processing.

Figure 17:
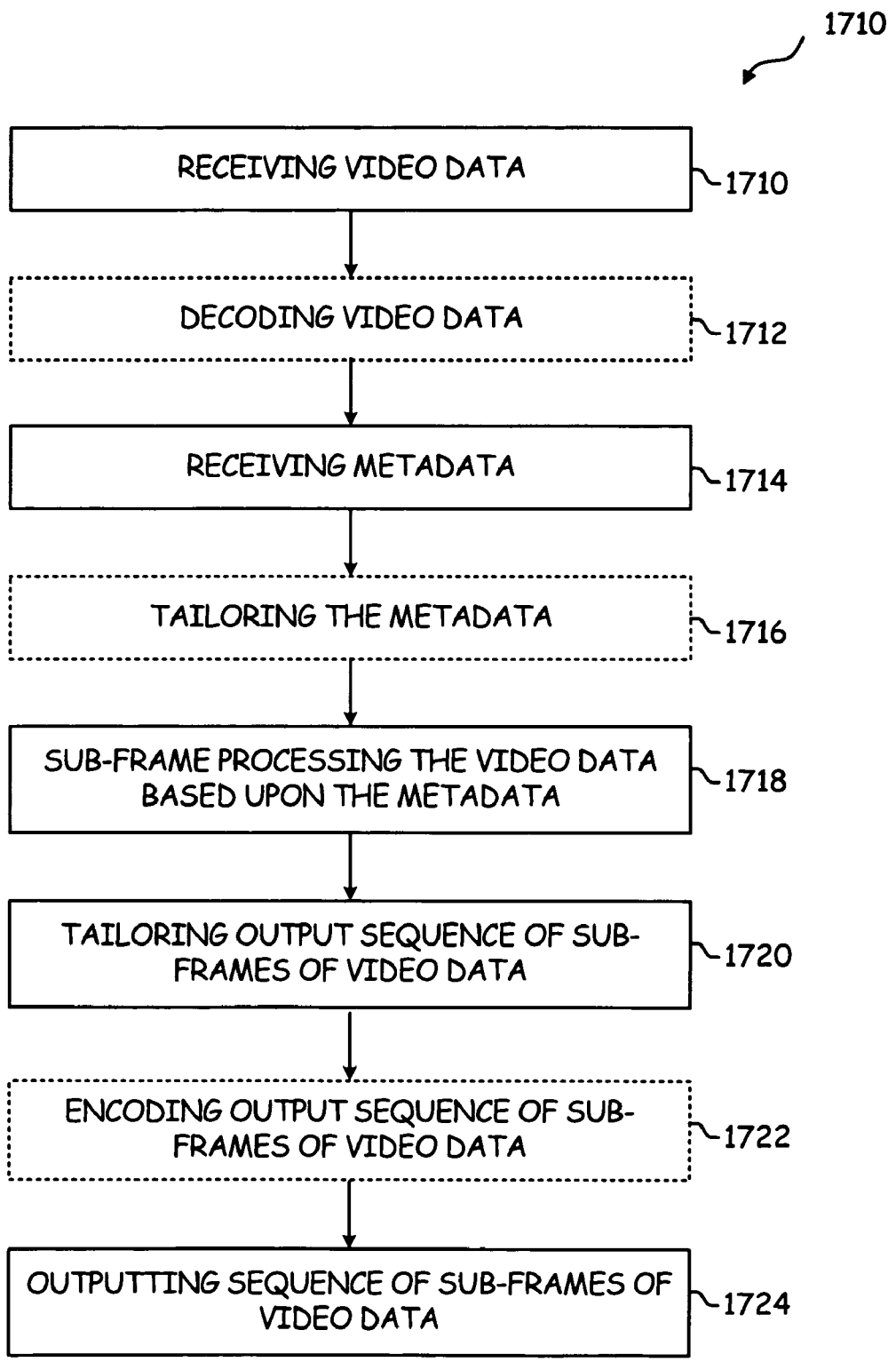
FIG. 17 is a flow chart illustrating a process for video processing and playback according to an embodiment of the present invention.

FIG. 17 is a flow chart illustrating a process for video processing according to an embodiment of the present invention. Operations 1700 of video processing circuitry according to the present invention commence with receiving video data (Step 1710). When the video data is received in an encoded format, the video processing circuitry decodes the video data (Step 1712). The video processing circuitry then receives metadata (Step 1714). This metadata may be general metadata as was described previously herein, similar metadata, or tailored metadata. When similar metadata or general metadata is received, the operation of FIG. 17 includes tailoring the metadata (Step 1716) based upon target display information. Step 1716 is optional.

Then, operation of FIG. 17 includes sub-frame processing the video data based upon the metadata (Step 1718). Then, operation includes tailoring an output sequence of sub-frames of video data produced at Step 1718 based upon target display information 20 (Step 1720). The operation of Step 1720 produces a tailored output sequence of sub-frames of video data. Then, this output sequence of sub-frames of video data is optionally encoded (Step 1722). Finally, the sequence of sub-frames of video data is output to storage, output to a target device via a network, or output in another fashion or to another locale (Step 1724).

According to one particular embodiment of FIG. 17, a video processing system receives video data representative of a sequence of full frames of video data. The video processing system then sub-frame processes the video data to generate both a first sequence of sub-frames of video data and a second sequence of sub-frames of video data. The first sequence of sub-frames of video data is defined by at least a first parameter, the second sequence of sub-frames of video data is defined by at least a second parameter, and the at least the first parameter and the at least the second parameter together comprise metadata. The video processing system then generates a third sequence of sub-frames of video data by combining the first sequence of sub-frames of video data with the second sequence of sub-frames of video data.

With this embodiment, the first sequence of sub-frames of video data may correspond to a first region within the sequence of full frames of video data and the second sequence of sub-frames of video data may correspond to a second region within the sequence of full frames of video data, with the first region different from the second region.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. Video player circuitry used with encoded source video and a display, the video player circuitry comprising:

decoder circuitry that receives encoded source video and decodes the encoded source video to produce a sequence of full frames of video data;

pre-processing circuitry that, pursuant to sub-frame information, generates a plurality of sequences of sub-frames of video data from the sequence of full frames of video data, a first sequence of the plurality of sequences of sub-frames of video data having a different center point within the sequence of full frames of video data than that of a second sequence of the plurality of sequences of sub-frames of video data, wherein each of the sub-frames of video data represents a sub-scene of a scene represented by a full frame of video data;

post-processing circuitry that, pursuant to supplemental information, modifies the plurality of sequences of sub-frames of video data to produce an output; and interface circuitry that delivers the output for subsequent presentation on the display.

2. The video player circuitry of claim 1, wherein the video player circuitry and the display are disposed in a single housing.

3. The video player circuitry of claim 1, wherein the video player circuitry is disposed in a first housing and the display is disposed in a second housing.

4. The video player circuitry of claim 1, wherein the decoder circuitry and the pre-processing circuitry that generates the plurality of sequences of sub-frames of video data are integrated.

5. The video player circuitry of claim 1, wherein the decoder circuitry decodes the encoded source video prior to the pre-processing circuitry generating the plurality of sequences of sub-frames of video data.

6. The video player circuitry of claim 1, wherein the sub-frame information comprises sub-frame metadata and the pre-processing circuitry comprises sub-frame metadata processing circuitry.

7. The video player circuitry of claim 1, wherein the sub-frame information and the supplemental information comprises sub-frame metadata.

8. The video player circuitry of claim 1, wherein:
the sequence of full frames of video data has a first resolution; and
the plurality of sequences of sub-frames of video data have a second resolution that is less than the first resolution.

9. The video player circuitry of claim 1, wherein:
the sequence of full frames of video data has a first aspect ratio; and
the plurality of sequences of sub-frames of video data have a second aspect ratio that differs from the first aspect ratio.

10. The video player circuitry of claim 1, wherein the display comprises a target display, and the output comprises tailored output.

11. The video player circuitry of claim 1, wherein the pre-processing circuitry and post-processing circuitry together comprise sub-frame metadata processing circuitry.

12. The video player circuitry of claim 1, wherein the pre-processing circuitry and post-processing circuitry together comprise sub-frame metadata processing circuitry and target display tailoring circuitry.

13. The video player circuitry of claim 1, wherein at least a portion of the decoder circuitry, the pre-processing circuitry, and the post-processing circuitry comprise general purpose processing circuitry that performs underlying functionality pursuant to program code.

14. A method for producing a video presentation on a display, the method comprising:
receiving a sequence of full frames of video data;
using a first sub-frame definition and a second sub-frame definition to respectively generate a first sequence of sub-frames of video data and a second sequence of sub-frames of video data from the sequence of full frames of video data, wherein each of the sub-frames of video data represents a sub-scene of a scene represented by a full frame of video data; and
delivering an output video sequence for presentation on the display, the output video sequence comprising the first sequence of sub-frames of video data and the second sequence of sub-frames of video data.

15. The method of claim 14, further comprising processing the first sequence of sub-frames of video data using first supplemental information, processing the second sequence of sub-frames of video data using second supplemental information, and the first supplemental information being different than the second supplemental information.

16. The method of claim 14, wherein the display has a display parameter, and the method further comprising processing the output video sequence based on the display parameter.

17. The method of claim 14, further comprising:
receiving encoded source video; and
decoding the encoded source video to produce the sequence of full frames of video data.

18. A video player software application embodied in non-transitory computer-readable media used with encoded source video and a display, the video player software application comprising:
a decoder that produces a sequence of full frames of video data from the encoded source video;
a sub-frame processor that generates from the sequence of full frames of video data both a first sequence of sub-frames of video data based on first location and sizing information and a second sequence of sub-frames of video data based on second location and sizing information, wherein each of the sub-frames of video data represents a sub-scene of a scene represented by a full frame of video data; and
a display interface that delivers the first sequence and second sequence of sub-frames of video data for full screen presentation on the display.

19. The video player software application embodied in computer-readable media of claim 18, wherein the video player software application runs on video player equipment.

20. The video player software application embodied in computer-readable media of claim 18, wherein the video player software application runs on an end-point client device.

21. The video player software application embodied in computer-readable media of claim 18, wherein the first location and sizing information and the second location and sizing information together comprise sub-frame metadata that is received by the sub-frame processor.

22. The video player software application embodied in computer-readable media of claim 21, wherein the sub-frame metadata further comprises display information, and the video player software application further comprises supplemental processing that tailors the first sequence and second sequence of sub-frames of video data based on the display information.

* * * * *

UNITED STATES PATENT AND TRADEMARK OFFICE
CERTIFICATE OF CORRECTION

| | | |
|---|---|---|
| PATENT NO. | : 7,953,315 B2 | Page 1 of 1 |
| APPLICATION NO. | : 11/491050 | |
| DATED | : May 31, 2011 | |
| INVENTOR(S) | : James D. Bennett | |

It is certified that error appears in the above-identified patent and that said Letters Patent is hereby corrected as shown below:

Col. 18, line 47, claim 19: Before "computer-readable media" insert --non-transitory--
Col. 18, line 50, claim 20: Before "computer-readable media" insert --non-transitory--
Col. 18, line 54, claim 21: Before "computer-readable media" insert --non-transitory--
Col. 18, line 59, claim 22: Before "computer-readable media" insert --non-transitory--

Signed and Sealed this
Thirtieth Day of October, 2012

David J. Kappos
*Director of the United States Patent and Trademark Office*